United States Patent
Badwe et al.

(10) Patent No.: US 11,717,886 B2
(45) Date of Patent: Aug. 8, 2023

(54) UNIQUE FEEDSTOCKS FOR SPHERICAL POWDERS AND METHODS OF MANUFACTURING

(71) Applicant: 6K Inc., North Andover, MA (US)

(72) Inventors: Sunil Bhalchandra Badwe, Export (PA); Scott Joseph Turchetti, Newburyport, MA (US); Makhlouf Redjdal, Melrose, MA (US)

(73) Assignee: 6K Inc., North Andover, MA (US)

( * ) Notice: Subject to any disclaimer, the term of this patent is extended or adjusted under 35 U.S.C. 154(b) by 0 days.

(21) Appl. No.: 16/950,729

(22) Filed: Nov. 17, 2020

(65) Prior Publication Data

US 2021/0146432 A1    May 20, 2021

Related U.S. Application Data

(60) Provisional application No. 62/937,054, filed on Nov. 18, 2019.

(51) Int. Cl.
  *B22F 1/065* (2022.01)
  *B33Y 70/00* (2020.01)
  (Continued)

(52) U.S. Cl.
  CPC .............. *B22F 1/065* (2022.01); *B22F 9/082* (2013.01); *B33Y 70/00* (2014.12);
  (Continued)

(58) Field of Classification Search
  None
  See application file for complete search history.

(56) References Cited

U.S. PATENT DOCUMENTS

| 1,699,205 A | 7/1925 | Podszus et al. |
| 2,892,215 A | 6/1959 | Naeser et al. |

(Continued)

FOREIGN PATENT DOCUMENTS

| AU | 2003211869 A1 | 9/2003 |
| AU | 2014394102 B2 | 6/2020 |

(Continued)

OTHER PUBLICATIONS

Murugan et al. Nanostructured α/β-tungsten by reduction of WO3 under microwave plasma. Int. Journal of Refractory Metals and Hard Materials 29 (2011) 128-133. (Year: 2011).*

(Continued)

*Primary Examiner* — Paul A Wartalowicz
*Assistant Examiner* — Stephani Hill
(74) *Attorney, Agent, or Firm* — Knobbe, Martens, Olson & Bear, LLP

(57) ABSTRACT

Disclosed herein are embodiments of methods, devices, and assemblies for processing feedstock materials using microwave plasma processing. Specifically, the feedstock materials disclosed herein pertains to unique powder feedstocks such as Tantalum, Yttrium Stabilized Zirconia, Aluminum, water atomized alloys, Rhenium, Tungsten, and Molybdenum. Microwave plasma processing can be used to spheroidize and remove contaminants. Advantageously, microwave plasma processed feedstock can be used in various applications such as additive manufacturing or powdered metallurgy (PM) applications that require high powder flowability.

13 Claims, 4 Drawing Sheets

(51) Int. Cl.
*B22F 9/08* (2006.01)
*C04B 35/58* (2006.01)
*C04B 35/626* (2006.01)

(52) U.S. Cl.
CPC .. *C04B 35/58014* (2013.01); *C04B 35/62665* (2013.01); *B22F 2009/0828* (2013.01); *B22F 2202/13* (2013.01); *B22F 2301/052* (2013.01); *B22F 2301/15* (2013.01); *B22F 2301/20* (2013.01); *B22F 2301/35* (2013.01); *C04B 2235/3225* (2013.01)

(56) References Cited

U.S. PATENT DOCUMENTS

| | | | |
|---|---|---|---|
| 3,290,723 A | 12/1966 | Jacques et al. | |
| 3,293,334 A | 12/1966 | Bylund et al. | |
| 3,434,831 A | 3/1969 | Knopp et al. | |
| 3,466,165 A | 9/1969 | Rhys et al. | |
| RE26,879 E | 5/1970 | Kelso | |
| 3,652,259 A | 3/1972 | Knopp | |
| 3,802,816 A | 4/1974 | Kaufmann | |
| 3,845,344 A | 10/1974 | Rainer | |
| 3,909,241 A | 9/1975 | Cheney et al. | |
| 3,966,374 A | 6/1976 | Honnorat et al. | |
| 3,974,245 A | 8/1976 | Cheney et al. | |
| 4,076,640 A | 2/1978 | Forgensi et al. | |
| 4,177,026 A | 12/1979 | Honnorat et al. | |
| 4,212,837 A | 7/1980 | Oguchi et al. | |
| 4,221,554 A | 9/1980 | Oguchi et al. | |
| 4,221,775 A | 9/1980 | Anno | |
| 4,423,303 A | 12/1983 | Hirose et al. | |
| 4,431,449 A | 2/1984 | Dillon et al. | |
| 4,439,410 A | 3/1984 | Santen et al. | |
| 4,544,404 A | 10/1985 | Yolton et al. | |
| 4,569,823 A | 2/1986 | Westin | |
| 4,599,880 A | 7/1986 | Stepanenko et al. | |
| 4,611,108 A | 9/1986 | Leprince et al. | |
| 4,670,047 A * | 6/1987 | Kopatz | B22F 1/065 |
| | | | 75/346 |
| 4,692,584 A | 9/1987 | Caneer, Jr. | |
| 4,705,560 A | 11/1987 | Kemp, Jr. et al. | |
| 4,711,660 A | 12/1987 | Kemp, Jr. et al. | |
| 4,711,661 A | 12/1987 | Kemp, Jr. et al. | |
| 4,714,587 A | 12/1987 | Eylon et al. | |
| 4,731,110 A | 3/1988 | Kopatz et al. | |
| 4,731,111 A | 3/1988 | Kopatz et al. | |
| 4,772,315 A | 9/1988 | Johnson et al. | |
| 4,778,515 A | 10/1988 | Kemp, Jr. et al. | |
| 4,780,131 A | 10/1988 | Kemp, Jr. et al. | |
| 4,783,216 A | 11/1988 | Kemp, Jr. et al. | |
| 4,783,218 A | 11/1988 | Kemp, Jr. et al. | |
| 4,787,934 A | 11/1988 | Johnson et al. | |
| 4,802,915 A | 2/1989 | Kopatz et al. | |
| 4,836,850 A | 6/1989 | Kemp, Jr. et al. | |
| 4,859,237 A | 8/1989 | Johnson et al. | |
| 4,923,509 A | 5/1990 | Kemp, Jr. et al. | |
| 4,943,322 A | 7/1990 | Kemp, Jr. et al. | |
| 4,944,797 A | 7/1990 | Kemp et al. | |
| 4,952,389 A | 8/1990 | Szymanski et al. | |
| 5,041,713 A | 8/1991 | Weidman | |
| 5,095,048 A | 3/1992 | Takahashi et al. | |
| 5,114,471 A | 5/1992 | Johnson et al. | |
| 5,131,992 A * | 7/1992 | Church | H05H 1/46 |
| | | | 423/440 |
| 5,200,595 A | 4/1993 | Boulos et al. | |
| 5,290,507 A | 3/1994 | Runkle | |
| 5,292,370 A | 3/1994 | Tsai et al. | |
| 5,376,475 A | 12/1994 | Ovshinsky et al. | |
| 5,411,592 A | 5/1995 | Ovshinsky et al. | |
| 5,431,967 A | 7/1995 | Manthiram et al. | |
| 5,518,831 A | 5/1996 | Tou et al. | |
| 5,676,919 A | 10/1997 | Kawamura et al. | |
| 5,750,013 A | 5/1998 | Lin | |
| 5,776,323 A | 7/1998 | Kobashi | |
| 5,958,361 A | 9/1999 | Laine et al. | |
| 5,980,977 A | 11/1999 | Deng et al. | |
| 5,989,648 A | 11/1999 | Phillips | |
| 6,027,585 A | 2/2000 | Patterson et al. | |
| 6,221,125 B1 | 4/2001 | Soda et al. | |
| 6,261,484 B1 | 7/2001 | Phillips et al. | |
| 6,274,110 B1 | 8/2001 | Kim et al. | |
| 6,329,628 B1 | 12/2001 | Kuo et al. | |
| 6,334,882 B1 | 1/2002 | Aslund | |
| 6,376,027 B1 | 4/2002 | Lee et al. | |
| 6,409,851 B1 | 6/2002 | Sethuram et al. | |
| 6,428,600 B1 | 8/2002 | Flurschutz et al. | |
| 6,543,380 B1 | 4/2003 | Sung-Spritzl | |
| 6,551,377 B1 | 4/2003 | Leonhardt | |
| 6,569,397 B1 | 5/2003 | Yadav et al. | |
| 6,579,573 B2 | 6/2003 | Strutt et al. | |
| 6,589,311 B1 | 7/2003 | Han et al. | |
| 6,652,822 B2 | 11/2003 | Phillips et al. | |
| 6,676,728 B2 | 1/2004 | Han et al. | |
| 6,689,192 B1 * | 2/2004 | Phillips | B22F 9/12 |
| | | | 75/346 |
| 6,752,979 B1 | 6/2004 | Talbot et al. | |
| 6,755,886 B2 | 6/2004 | Phillips et al. | |
| 6,780,219 B2 | 8/2004 | Singh et al. | |
| 6,793,849 B1 | 9/2004 | Gruen et al. | |
| 6,805,822 B2 | 10/2004 | Takei et al. | |
| 6,838,072 B1 | 1/2005 | Kong et al. | |
| 6,869,550 B2 | 3/2005 | Dorfman et al. | |
| 6,902,745 B2 | 6/2005 | Lee et al. | |
| 6,919,257 B2 | 7/2005 | Gealy et al. | |
| 6,919,527 B2 | 7/2005 | Boulos et al. | |
| 6,989,529 B2 | 1/2006 | Wiseman | |
| 7,066,980 B2 | 6/2006 | Akimoto et al. | |
| 7,091,441 B1 | 8/2006 | Kuo | |
| 7,108,733 B2 | 9/2006 | Enokido | |
| 7,125,537 B2 | 10/2006 | Liao et al. | |
| 7,125,822 B2 | 10/2006 | Nakano et al. | |
| 7,175,786 B2 | 2/2007 | Celikkaya et al. | |
| 7,182,929 B1 | 2/2007 | Singhal et al. | |
| 7,220,398 B2 | 5/2007 | Sutorik et al. | |
| 7,235,118 B2 | 6/2007 | Bouaricha et al. | |
| 7,285,194 B2 | 10/2007 | Uno et al. | |
| 7,285,307 B2 | 10/2007 | Hohenthanner et al. | |
| 7,297,310 B1 | 11/2007 | Peng et al. | |
| 7,297,892 B2 | 11/2007 | Kelley et al. | |
| 7,344,776 B2 | 3/2008 | Kollmann et al. | |
| 7,357,910 B2 | 4/2008 | Phillips et al. | |
| 7,368,130 B2 | 5/2008 | Kim et al. | |
| 7,374,704 B2 | 5/2008 | Che et al. | |
| 7,375,303 B2 | 5/2008 | Twarog | |
| 7,431,750 B2 | 10/2008 | Liao et al. | |
| 7,442,271 B2 | 10/2008 | Asmussen et al. | |
| 7,491,468 B2 | 2/2009 | Okada et al. | |
| 7,517,513 B2 | 4/2009 | Sarkas et al. | |
| 7,524,353 B2 | 4/2009 | Johnson, Jr. et al. | |
| 7,534,296 B2 | 5/2009 | Swain et al. | |
| 7,572,315 B2 | 8/2009 | Boulos et al. | |
| 7,622,211 B2 | 11/2009 | Vyas et al. | |
| 7,629,553 B2 | 12/2009 | Fanson et al. | |
| 7,700,152 B2 | 4/2010 | Laine et al. | |
| 7,776,303 B2 | 8/2010 | Hung et al. | |
| 7,806,077 B2 | 10/2010 | Lee et al. | |
| 7,828,999 B2 | 11/2010 | Yubuta et al. | |
| 7,901,658 B2 | 3/2011 | Weppner et al. | |
| 7,931,836 B2 | 4/2011 | Xie et al. | |
| 7,939,141 B2 | 5/2011 | Matthews et al. | |
| 8,007,691 B2 | 8/2011 | Sawaki et al. | |
| 8,043,405 B2 | 10/2011 | Johnson, Jr. et al. | |
| 8,092,941 B2 | 1/2012 | Weppner et al. | |
| 8,101,061 B2 | 1/2012 | Suh et al. | |
| 8,168,128 B2 | 5/2012 | Seeley et al. | |
| 8,178,240 B2 | 5/2012 | Wang et al. | |
| 8,192,865 B2 | 6/2012 | Buiel et al. | |
| 8,193,291 B2 | 6/2012 | Zhang | |
| 8,211,388 B2 | 7/2012 | Woodfield et al. | |
| 8,268,230 B2 | 9/2012 | Cherepy et al. | |
| 8,283,275 B2 | 10/2012 | Heo et al. | |
| 8,303,926 B1 | 11/2012 | Luhrs et al. | |
| 8,329,090 B2 | 12/2012 | Hollingsworth et al. | |

(56) References Cited

U.S. PATENT DOCUMENTS

| | | |
|---|---|---|
| 8,329,257 B2 | 12/2012 | Larouche et al. |
| 8,338,323 B2 | 12/2012 | Takasu et al. |
| 8,389,160 B2 | 3/2013 | Venkatachalam et al. |
| 8,420,043 B2 | 4/2013 | Gamo et al. |
| 8,439,998 B2 | 5/2013 | Ito et al. |
| 8,449,950 B2 | 5/2013 | Shang et al. |
| 8,478,785 B2 | 7/2013 | Jamjoom et al. |
| 8,492,303 B2 | 7/2013 | Bulan et al. |
| 8,529,996 B2 | 9/2013 | Bocian et al. |
| 8,592,767 B2 | 11/2013 | Rappe et al. |
| 8,597,722 B2 | 12/2013 | Albano et al. |
| 8,623,555 B2 | 1/2014 | Kang et al. |
| 8,658,317 B2 | 2/2014 | Weppner et al. |
| 8,685,593 B2 | 4/2014 | Dadheech et al. |
| 8,728,680 B2 | 5/2014 | Mikhail et al. |
| 8,735,022 B2 | 5/2014 | Schlag et al. |
| 8,748,785 B2 | 6/2014 | Jordan et al. |
| 8,758,957 B2 | 6/2014 | Dadheech et al. |
| 8,784,706 B2 | 7/2014 | Shevchenko et al. |
| 8,822,000 B2 | 9/2014 | Kumagai et al. |
| 8,840,701 B2 | 9/2014 | Borland et al. |
| 8,877,119 B2 | 11/2014 | Jordan et al. |
| 8,911,529 B2 | 12/2014 | Withers et al. |
| 8,919,428 B2 | 12/2014 | Cola et al. |
| 8,945,431 B2 | 2/2015 | Schulz et al. |
| 8,951,496 B2 | 2/2015 | Hadidi et al. |
| 8,956,785 B2 | 2/2015 | Dadheech et al. |
| 8,968,587 B2 | 3/2015 | Shin et al. |
| 8,968,669 B2 | 3/2015 | Chen |
| 8,980,485 B2 | 3/2015 | Lanning et al. |
| 8,999,440 B2 | 4/2015 | Zenasni et al. |
| 9,023,259 B2 | 5/2015 | Hadidi et al. |
| 9,065,141 B2 | 6/2015 | Merzougui et al. |
| 9,067,264 B2 | 6/2015 | Moxson et al. |
| 9,079,778 B2 | 7/2015 | Kelley et al. |
| 9,085,490 B2 | 7/2015 | Taylor et al. |
| 9,101,982 B2 | 8/2015 | Aslund |
| 9,136,569 B2 | 9/2015 | Song et al. |
| 9,150,422 B2 | 10/2015 | Nakayama et al. |
| 9,193,133 B2 | 11/2015 | Shin et al. |
| 9,196,901 B2 | 11/2015 | Se-Hee et al. |
| 9,196,905 B2 | 11/2015 | Tzeng et al. |
| 9,206,085 B2 | 12/2015 | Hadidi et al. |
| 9,242,224 B2 | 1/2016 | Redjdal et al. |
| 9,259,785 B2 | 2/2016 | Hadidi et al. |
| 9,293,302 B2 | 3/2016 | Risby et al. |
| 9,321,071 B2 | 4/2016 | Jordan et al. |
| 9,322,081 B2 | 4/2016 | McHugh et al. |
| 9,352,278 B2 | 5/2016 | Spatz et al. |
| 9,356,281 B2 | 5/2016 | Verbrugge et al. |
| 9,368,772 B1 | 6/2016 | Chen et al. |
| 9,412,998 B2 | 8/2016 | Rojeski et al. |
| 9,421,612 B2 | 8/2016 | Fang et al. |
| 9,425,463 B2 | 8/2016 | Hsu et al. |
| 9,463,435 B2 | 10/2016 | Schulz et al. |
| 9,520,600 B2 | 12/2016 | Dadheech et al. |
| 9,624,565 B2 | 4/2017 | Lee et al. |
| 9,630,162 B1 | 4/2017 | Sunkara et al. |
| 9,643,891 B2 | 5/2017 | Hadidi et al. |
| 9,700,877 B2 | 7/2017 | Kim et al. |
| 9,705,136 B2 | 7/2017 | Rojeski |
| 9,718,131 B2 | 8/2017 | Boulos et al. |
| 9,735,427 B2 | 8/2017 | Zhang |
| 9,738,788 B1 | 8/2017 | Gross et al. |
| 9,751,129 B2 | 9/2017 | Boulos et al. |
| 9,768,033 B2 | 9/2017 | Ranjan et al. |
| 9,776,378 B2 | 10/2017 | Choi |
| 9,782,791 B2 | 10/2017 | Redjdal et al. |
| 9,782,828 B2 | 10/2017 | Wilkinson |
| 9,796,019 B2 | 10/2017 | She et al. |
| 9,796,020 B2 | 10/2017 | Aslund |
| 9,831,503 B2 | 11/2017 | Sopchak |
| 9,871,248 B2 | 1/2018 | Rayner et al. |
| 9,879,344 B2 | 1/2018 | Lee et al. |
| 9,899,674 B2 | 2/2018 | Hirai et al. |
| 9,917,299 B2 | 3/2018 | Behan et al. |
| 9,932,673 B2 | 4/2018 | Jordan et al. |
| 9,945,034 B2 | 4/2018 | Yao et al. |
| 9,947,926 B2 | 4/2018 | Kim et al. |
| 9,981,284 B2 | 5/2018 | Guo et al. |
| 9,991,458 B2 | 6/2018 | Rosenman et al. |
| 9,999,922 B1 | 6/2018 | Struve |
| 10,011,491 B2 | 7/2018 | Lee et al. |
| 10,050,303 B2 | 8/2018 | Anandan et al. |
| 10,057,986 B2 | 8/2018 | Prud'Homme et al. |
| 10,065,240 B2 | 9/2018 | Chen |
| 10,079,392 B2 | 9/2018 | Huang et al. |
| 10,116,000 B1 | 10/2018 | Federici et al. |
| 10,130,994 B2 | 11/2018 | Fang et al. |
| 10,167,556 B2 | 1/2019 | Ruzic et al. |
| 10,170,753 B2 | 1/2019 | Ren et al. |
| 10,193,142 B2 | 1/2019 | Rojeski |
| 10,244,614 B2 | 3/2019 | Foret |
| 10,319,537 B2 | 6/2019 | Claussen et al. |
| 10,333,183 B2 | 6/2019 | Sloop |
| 10,350,680 B2 | 7/2019 | Yamamoto et al. |
| 10,411,253 B2 | 9/2019 | Tzeng et al. |
| 10,439,206 B2 | 10/2019 | Behan et al. |
| 10,442,000 B2 | 10/2019 | Fukada et al. |
| 10,461,298 B2 | 10/2019 | Herle |
| 10,477,665 B2 | 11/2019 | Hadidi |
| 10,493,524 B2 | 12/2019 | She et al. |
| 10,522,300 B2 | 12/2019 | Yang |
| 10,526,684 B2 | 1/2020 | Ekman et al. |
| 10,529,486 B2 | 1/2020 | Nishisaka |
| 10,543,534 B2 | 1/2020 | Hadidi et al. |
| 10,593,985 B2 | 3/2020 | Sastry et al. |
| 10,610,929 B2 | 4/2020 | Fang et al. |
| 10,637,029 B2 | 4/2020 | Gotlib Vainshtein et al. |
| 10,638,592 B2 | 4/2020 | Foret |
| 10,639,712 B2 | 5/2020 | Barnes et al. |
| 10,647,824 B2 | 5/2020 | Hwang et al. |
| 10,655,206 B2 | 5/2020 | Moon et al. |
| 10,665,890 B2 | 5/2020 | Kang et al. |
| 10,668,566 B2 | 6/2020 | Smathers et al. |
| 10,669,437 B2 | 6/2020 | Cox et al. |
| 10,688,564 B2 | 6/2020 | Boulos et al. |
| 10,707,477 B2 | 7/2020 | Sastry et al. |
| 10,717,150 B2 | 7/2020 | Aleksandrov et al. |
| 10,727,477 B2 | 7/2020 | Kim et al. |
| 10,741,845 B2 | 8/2020 | Yushin et al. |
| 10,744,590 B2 | 8/2020 | Maier et al. |
| 10,756,334 B2 | 8/2020 | Stowell et al. |
| 10,766,787 B1 | 9/2020 | Sunkara et al. |
| 10,777,804 B2 | 9/2020 | Sastry et al. |
| 10,858,255 B2 | 12/2020 | Koziol et al. |
| 10,858,500 B2 | 12/2020 | Chen et al. |
| 10,892,477 B2 | 1/2021 | Choi et al. |
| 10,930,473 B2 | 2/2021 | Paukner et al. |
| 10,943,744 B2 | 3/2021 | Sungail et al. |
| 10,944,093 B2 | 3/2021 | Paz et al. |
| 10,964,938 B2 | 3/2021 | Rojeski |
| 10,987,735 B2 | 4/2021 | Hadidi et al. |
| 10,998,552 B2 | 5/2021 | Lanning et al. |
| 11,031,641 B2 | 6/2021 | Gupta et al. |
| 11,050,061 B2 | 6/2021 | Kim et al. |
| 11,072,533 B2 | 7/2021 | Shevchenko et al. |
| 11,077,524 B2 | 8/2021 | Smathers et al. |
| 11,108,050 B2 | 8/2021 | Kim et al. |
| 11,116,000 B2 | 9/2021 | Sandberg et al. |
| 11,130,175 B2 | 9/2021 | Parrish et al. |
| 11,130,994 B2 | 9/2021 | Shachar et al. |
| 11,133,495 B2 | 9/2021 | Gazda et al. |
| 11,148,202 B2 | 10/2021 | Hadidi et al. |
| 11,167,556 B2 | 11/2021 | Shimada et al. |
| 11,170,753 B2 | 11/2021 | Nomura et al. |
| 11,171,322 B2 | 11/2021 | Seol et al. |
| 11,183,682 B2 | 11/2021 | Sunkara et al. |
| 11,193,142 B2 | 12/2021 | Angelidaki et al. |
| 11,196,045 B2 | 12/2021 | Dadheech et al. |
| 11,219,884 B2 | 1/2022 | Takeda et al. |
| 11,244,614 B2 | 2/2022 | He et al. |
| 11,245,065 B1 | 2/2022 | Ouderkirk et al. |
| 11,245,109 B2 | 2/2022 | Tzeng et al. |

(56) References Cited

U.S. PATENT DOCUMENTS

| | | |
|---|---|---|
| 11,254,585 B2 | 2/2022 | Ekman et al. |
| 11,273,322 B2 | 3/2022 | Zanata et al. |
| 11,273,491 B2 | 3/2022 | Barnes et al. |
| 11,299,397 B2 | 4/2022 | Lanning et al. |
| 11,311,938 B2 | 4/2022 | Badwe et al. |
| 11,319,537 B2 | 5/2022 | Dames et al. |
| 11,333,183 B2 | 5/2022 | Desai et al. |
| 11,335,911 B2 | 5/2022 | Lanning et al. |
| 11,350,680 B2 | 6/2022 | Rutkoski et al. |
| 11,411,253 B2 | 8/2022 | Busacca et al. |
| 11,439,206 B2 | 9/2022 | Santos |
| 11,442,000 B2 | 9/2022 | Vaez-Iravani et al. |
| 11,461,298 B1 | 10/2022 | Shemmer et al. |
| 11,465,201 B2 | 10/2022 | Barnes et al. |
| 11,471,941 B2 | 10/2022 | Barnes et al. |
| 11,477,665 B2 | 10/2022 | Franke et al. |
| 11,577,314 B2 | 2/2023 | Hadidi et al. |
| 11,590,568 B2 | 2/2023 | Badwe et al. |
| 11,611,130 B2 | 3/2023 | Wrobel et al. |
| 11,633,785 B2 | 4/2023 | Badwe et al. |
| 2001/0016283 A1 | 8/2001 | Shiraishi et al. |
| 2001/0021740 A1 | 9/2001 | Lodyga et al. |
| 2002/0112794 A1* | 8/2002 | Sethuram .............. B22F 1/054 75/255 |
| 2003/0027021 A1 | 2/2003 | Sharivker et al. |
| 2003/0129497 A1 | 7/2003 | Yamamoto et al. |
| 2003/0172772 A1 | 9/2003 | Sethuram et al. |
| 2003/0186128 A1 | 10/2003 | Singh et al. |
| 2003/0207978 A1* | 11/2003 | Yadav ................. C08K 3/01 523/200 |
| 2004/0013941 A1 | 1/2004 | Kobayashi et al. |
| 2004/0045807 A1 | 3/2004 | Sarkas et al. |
| 2004/0060387 A1 | 4/2004 | Tanner-Jones |
| 2004/0123699 A1 | 7/2004 | Liao et al. |
| 2005/0025698 A1 | 2/2005 | Talbot et al. |
| 2005/0163696 A1 | 7/2005 | Uhm et al. |
| 2005/0242070 A1 | 11/2005 | Hammer |
| 2005/0260786 A1 | 11/2005 | Yoshikawa et al. |
| 2006/0040168 A1 | 2/2006 | Sridhar |
| 2006/0141153 A1 | 6/2006 | Kubota et al. |
| 2006/0145124 A1 | 7/2006 | Hsiao et al. |
| 2006/0291827 A1 | 12/2006 | Suib et al. |
| 2007/0077350 A1 | 4/2007 | Hohenthanner et al. |
| 2007/0089860 A1 | 4/2007 | Hou et al. |
| 2007/0209758 A1 | 9/2007 | Sompalli et al. |
| 2007/0221635 A1 | 9/2007 | Boulos et al. |
| 2007/0259768 A1 | 11/2007 | Kear et al. |
| 2008/0029485 A1 | 2/2008 | Kelley et al. |
| 2008/0182114 A1 | 7/2008 | Kim et al. |
| 2008/0220244 A1 | 9/2008 | Wai et al. |
| 2008/0286490 A1 | 11/2008 | Bogdanoff et al. |
| 2008/0296268 A1 | 12/2008 | Mike et al. |
| 2008/0305025 A1 | 12/2008 | Vitner et al. |
| 2009/0074655 A1 | 3/2009 | Suciu |
| 2009/0093553 A1 | 4/2009 | Jager et al. |
| 2009/0155689 A1 | 6/2009 | Zaghib et al. |
| 2009/0202869 A1 | 8/2009 | Sawaki et al. |
| 2009/0258255 A1 | 10/2009 | Terashima et al. |
| 2009/0305132 A1 | 12/2009 | Gauthier et al. |
| 2010/0007162 A1 | 1/2010 | Han et al. |
| 2010/0096362 A1 | 4/2010 | Hirayama et al. |
| 2010/0176524 A1 | 7/2010 | Burgess et al. |
| 2011/0006254 A1 | 1/2011 | Richard et al. |
| 2012/0015284 A1 | 1/2012 | Merzougui et al. |
| 2012/0027955 A1 | 2/2012 | Sunkara et al. |
| 2012/0034135 A1 | 2/2012 | Risby |
| 2012/0048064 A1 | 3/2012 | Kasper et al. |
| 2012/0051962 A1 | 3/2012 | Imam et al. |
| 2012/0074342 A1 | 3/2012 | Kim et al. |
| 2012/0100438 A1 | 4/2012 | Fasching et al. |
| 2012/0122017 A1 | 5/2012 | Mills |
| 2012/0230860 A1 | 9/2012 | Ward-Close et al. |
| 2012/0240726 A1 | 9/2012 | Kim et al. |
| 2012/0294919 A1 | 11/2012 | Jaynes et al. |
| 2013/0032753 A1 | 2/2013 | Yamamoto et al. |
| 2013/0071284 A1 | 3/2013 | Kano et al. |
| 2013/0078508 A1 | 3/2013 | Tolbert et al. |
| 2013/0084474 A1 | 4/2013 | Mills |
| 2014/0131906 A1* | 5/2014 | Hadidi ................. B29B 9/16 264/15 |
| 2014/0202286 A1 | 7/2014 | Yokoyama et al. |
| 2014/0272430 A1 | 9/2014 | Kalayaraman |
| 2014/0322632 A1 | 10/2014 | Sugimoto et al. |
| 2014/0373344 A1 | 12/2014 | Takada et al. |
| 2015/0000844 A1 | 1/2015 | Woo |
| 2015/0101454 A1 | 4/2015 | Shimizu et al. |
| 2015/0167143 A1 | 6/2015 | Luce et al. |
| 2015/0171455 A1 | 6/2015 | Mills |
| 2015/0255767 A1 | 9/2015 | Aetukuri et al. |
| 2015/0259220 A1 | 9/2015 | Rosocha et al. |
| 2015/0333307 A1 | 11/2015 | Thokchom et al. |
| 2016/0028088 A1 | 1/2016 | Romeo et al. |
| 2016/0045841 A1 | 2/2016 | Kaplan et al. |
| 2016/0152480 A1 | 6/2016 | Jang et al. |
| 2016/0285090 A1 | 9/2016 | Ozkan et al. |
| 2016/0287113 A1 | 10/2016 | Hebert et al. |
| 2016/0308244 A1 | 10/2016 | Badding et al. |
| 2016/0332232 A1 | 11/2016 | Forbes Jones et al. |
| 2016/0351910 A1 | 12/2016 | Albano et al. |
| 2017/0009328 A1 | 1/2017 | Germann et al. |
| 2017/0070180 A1 | 3/2017 | Mills |
| 2017/0113935 A1 | 4/2017 | Pennington et al. |
| 2017/0120339 A1 | 5/2017 | Aslund |
| 2017/0125842 A1 | 5/2017 | Meguro et al. |
| 2017/0151609 A1 | 6/2017 | Elsen et al. |
| 2017/0176977 A1 | 6/2017 | Huang et al. |
| 2017/0179477 A1 | 6/2017 | Walters et al. |
| 2017/0368604 A1 | 12/2017 | Wilkinson |
| 2017/0373344 A1 | 12/2017 | Hadidi et al. |
| 2018/0022928 A1 | 1/2018 | Blush |
| 2018/0083264 A1 | 3/2018 | Soppe |
| 2018/0104745 A1 | 4/2018 | L'Esperance et al. |
| 2018/0159178 A1 | 6/2018 | Weisenstein et al. |
| 2018/0169763 A1 | 6/2018 | Dorval et al. |
| 2018/0214956 A1* | 8/2018 | Larouche .............. C22C 1/0416 |
| 2018/0241956 A1* | 8/2018 | Suzuki ................. H04N 5/3698 |
| 2018/0248175 A1 | 8/2018 | Ghezelbash et al. |
| 2018/0277849 A1 | 9/2018 | Gayden |
| 2018/0297122 A1 | 10/2018 | Hadidi et al. |
| 2018/0346344 A1 | 12/2018 | Chen et al. |
| 2018/0366707 A1 | 12/2018 | Johnson et al. |
| 2018/0375149 A1 | 12/2018 | Beck et al. |
| 2019/0001416 A1 | 1/2019 | Larouche et al. |
| 2019/0061005 A1 | 2/2019 | Kelkar |
| 2019/0084290 A1 | 3/2019 | Stoyanov et al. |
| 2019/0125842 A1 | 5/2019 | Grabowski |
| 2019/0127835 A1 | 5/2019 | Yang et al. |
| 2019/0160528 A1 | 5/2019 | McGee et al. |
| 2019/0165413 A1 | 5/2019 | Furusawa |
| 2019/0173130 A1 | 6/2019 | Schuhmacher et al. |
| 2019/0218650 A1 | 7/2019 | Subramanian et al. |
| 2019/0271068 A1 | 9/2019 | Sungail et al. |
| 2019/0292441 A1 | 9/2019 | Hill et al. |
| 2019/0334206 A1 | 10/2019 | Sastry et al. |
| 2019/0341650 A9 | 11/2019 | Lanning et al. |
| 2019/0348202 A1 | 11/2019 | Sachdev et al. |
| 2019/0362936 A1 | 11/2019 | Van Den Berg et al. |
| 2019/0381564 A1* | 12/2019 | Barnes ................. B33Y 70/00 |
| 2019/0389734 A1 | 12/2019 | Dietz et al. |
| 2020/0067128 A1 | 2/2020 | Chmiola et al. |
| 2020/0136176 A1 | 4/2020 | Chen |
| 2020/0153037 A1 | 5/2020 | Renna et al. |
| 2020/0198977 A1 | 6/2020 | Hof et al. |
| 2020/0203706 A1 | 6/2020 | Holman et al. |
| 2020/0207668 A1 | 7/2020 | Cavalli et al. |
| 2020/0215606 A1 | 7/2020 | Barnes et al. |
| 2020/0220222 A1 | 7/2020 | Watarai et al. |
| 2020/0223704 A1 | 7/2020 | Neale et al. |
| 2020/0227728 A1 | 7/2020 | Huang et al. |
| 2020/0254432 A1 | 8/2020 | Shirman et al. |
| 2020/0276638 A1 | 9/2020 | King et al. |
| 2020/0288561 A1 | 9/2020 | Huh |
| 2020/0314991 A1 | 10/2020 | Duanmu et al. |
| 2020/0335754 A1 | 10/2020 | Ramasubramanian et al. |

(56) References Cited

U.S. PATENT DOCUMENTS

| | | |
|---|---|---|
| 2020/0335781 A1 | 10/2020 | Oshita et al. |
| 2020/0346287 A1 | 11/2020 | Badwe et al. |
| 2020/0350542 A1 | 11/2020 | Wrobel et al. |
| 2020/0350565 A1 | 11/2020 | Oshita et al. |
| 2020/0358093 A1 | 11/2020 | Oshita et al. |
| 2020/0358096 A1 | 11/2020 | Paulsen et al. |
| 2020/0388857 A1 | 12/2020 | Sunkara et al. |
| 2020/0391295 A1 | 12/2020 | Dorval et al. |
| 2020/0395607 A1 | 12/2020 | Tzeng |
| 2020/0407858 A1 | 12/2020 | Sano et al. |
| 2021/0047186 A1 | 2/2021 | Ifuku et al. |
| 2021/0075000 A1 | 3/2021 | Holman et al. |
| 2021/0078072 A1 | 3/2021 | Barnes et al. |
| 2021/0085468 A1 | 3/2021 | Ryd et al. |
| 2021/0129216 A1 | 5/2021 | Barnes et al. |
| 2021/0139331 A1 | 5/2021 | Kang et al. |
| 2021/0187607 A1 | 6/2021 | Badwe et al. |
| 2021/0187614 A1 | 6/2021 | Tsubota et al. |
| 2021/0226302 A1 | 7/2021 | Lanning et al. |
| 2021/0252599 A1 | 8/2021 | Hadidi et al. |
| 2021/0253430 A1 | 8/2021 | Zaplotnik et al. |
| 2021/0273292 A1 | 9/2021 | Yun et al. |
| 2021/0276094 A1 | 9/2021 | Sobu et al. |
| 2021/0296731 A1 | 9/2021 | Wrobel et al. |
| 2021/0310110 A1 | 10/2021 | Stowell et al. |
| 2021/0344059 A1 | 11/2021 | Ekman et al. |
| 2021/0367264 A1 | 11/2021 | Hadidi et al. |
| 2021/0408533 A1 | 12/2021 | Holman et al. |
| 2022/0041457 A1 | 2/2022 | Pullen et al. |
| 2022/0095445 A1 | 3/2022 | Shang et al. |
| 2022/0118517 A1 | 4/2022 | Hadidi et al. |
| 2022/0127145 A1 | 4/2022 | Ding et al. |
| 2022/0134431 A1 | 5/2022 | Badwe et al. |
| 2022/0143693 A1 | 5/2022 | Larouche et al. |
| 2022/0223379 A1 | 7/2022 | Holman et al. |
| 2022/0228288 A1 | 7/2022 | Holman et al. |
| 2022/0267216 A1 | 8/2022 | Holman et al. |
| 2022/0288685 A1 | 9/2022 | Badwe et al. |
| 2022/0314325 A1 | 10/2022 | Badwe |
| 2022/0324022 A1 | 10/2022 | Badwe |
| 2023/0001375 A1 | 1/2023 | Kozlowski et al. |
| 2023/0001376 A1 | 1/2023 | Kozlowski et al. |
| 2023/0032362 A1 | 2/2023 | Holman et al. |
| 2023/0144075 A1 | 5/2023 | Badwe et al. |

FOREIGN PATENT DOCUMENTS

| | | | |
|---|---|---|---|
| CA | 2947531 A1 | 11/2015 | |
| CN | 1188073 A | 7/1998 | |
| CN | 1653869 A | 8/2005 | |
| CN | 1675785 A | 9/2005 | |
| CN | 1967911 A | 5/2007 | |
| CN | 101191204 A | 6/2008 | |
| CN | 101391307 A * | 3/2009 | |
| CN | 101728509 A | 6/2010 | |
| CN | 101716686 B | 2/2011 | |
| CN | 102394290 A | 3/2012 | |
| CN | 102412377 A | 4/2012 | |
| CN | 102427130 A | 4/2012 | |
| CN | 102664273 A | 9/2012 | |
| CN | 102723502 A | 10/2012 | |
| CN | 102179521 B | 1/2013 | |
| CN | 102867940 A | 1/2013 | |
| CN | 102983312 A | 3/2013 | |
| CN | 103121105 A | 5/2013 | |
| CN | 103402921 A | 11/2013 | |
| CN | 102554242 B | 12/2013 | |
| CN | 103456926 A | 12/2013 | |
| CN | 103682372 A | 3/2014 | |
| CN | 103682383 A | 3/2014 | |
| CN | 103700815 A | 4/2014 | |
| CN | 103874538 A | 6/2014 | |
| CN | 103956520 A | 7/2014 | |
| CN | 104064736 A | 9/2014 | |
| CN | 104084592 A | 10/2014 | |
| CN | 104209526 A | 12/2014 | |
| CN | 104218213 A | 12/2014 | |
| CN | 204156003 U | 2/2015 | |
| CN | 104485452 A | 4/2015 | |
| CN | 104752734 A | 7/2015 | |
| CN | 103515590 B | 9/2015 | |
| CN | 105514373 A | 4/2016 | |
| CN | 104772473 B | 9/2016 | |
| CN | 106159316 A | 11/2016 | |
| CN | 106450146 A | 2/2017 | |
| CN | 106493350 A | 3/2017 | |
| CN | 206040854 U | 3/2017 | |
| CN | 106684387 A | 5/2017 | |
| CN | 106784692 A | 5/2017 | |
| CN | 107093732 A | 8/2017 | |
| CN | 107579241 A | 1/2018 | |
| CN | 108134104 A | 6/2018 | |
| CN | 108145170 A | 6/2018 | |
| CN | 108217612 A | 6/2018 | |
| CN | 108649190 A | 10/2018 | |
| CN | 108907210 A | 11/2018 | |
| CN | 108963239 A | 12/2018 | |
| CN | 109167070 A | 1/2019 | |
| CN | 109301212 A | 2/2019 | |
| CN | 109616622 A | 4/2019 | |
| CN | 109742320 A | 5/2019 | |
| CN | 109888233 A | 6/2019 | |
| CN | 110153434 A | 8/2019 | |
| CN | 110299516 A | 10/2019 | |
| CN | 110790263 A | 2/2020 | |
| CN | 110993908 A | 4/2020 | |
| CN | 111099577 A | 5/2020 | |
| CN | 111342163 A | 6/2020 | |
| CN | 111370751 A | 7/2020 | |
| CN | 111403701 A | 7/2020 | |
| CN | 111515391 A | 8/2020 | |
| CN | 111970807 A | 11/2020 | |
| CN | 112259740 A | 1/2021 | |
| CN | 112331947 A | 2/2021 | |
| CN | 112397706 A | 2/2021 | |
| CN | 112421006 A | 2/2021 | |
| CN | 112421048 A | 2/2021 | |
| CN | 112447977 A | 3/2021 | |
| CN | 112768709 A | 5/2021 | |
| CN | 112768710 A | 5/2021 | |
| CN | 112768711 A | 5/2021 | |
| CN | 112864453 A | 5/2021 | |
| CN | 113097487 A | 7/2021 | |
| CN | 113104838 A | 7/2021 | |
| CN | 113764688 A | 12/2021 | |
| CN | 113871581 A | 12/2021 | |
| CN | 114388822 A | 4/2022 | |
| CN | 114744315 A | 7/2022 | |
| CN | 114824297 A | 7/2022 | |
| CN | 115394976 A | 11/2022 | |
| DE | 10335355 A1 | 11/2004 | |
| DE | 102009033251 A1 | 9/2010 | |
| DE | 102010006440 A1 | 8/2011 | |
| DE | 102011109137 A1 | 2/2013 | |
| DE | 102018132896 A1 | 6/2020 | |
| EP | 0 256 233 A2 | 2/1988 | |
| EP | 2 292 557 A1 | 3/2011 | |
| EP | 3 143 838 A1 | 3/2017 | |
| FR | 2525122 A1 | 10/1983 | |
| FR | 2591412 A * | 6/1987 | ............ B01J 12/002 |
| GB | 2595745 A | 12/2021 | |
| IN | 202011017775 | 10/2021 | |
| JP | 10-172564 | 6/1998 | |
| JP | 11-064556 A | 3/1999 | |
| JP | 2001-348296 A | 12/2001 | |
| JP | 2004-505761 A | 2/2004 | |
| JP | 2004-193115 A | 7/2004 | |
| JP | 2004-311297 A | 11/2004 | |
| JP | 2004-362895 A | 12/2004 | |
| JP | 2005-015282 A | 1/2005 | |
| JP | 2005-072015 A | 3/2005 | |
| JP | 2005-076052 A | 3/2005 | |
| JP | 2005-135755 A | 5/2005 | |
| JP | 2005-187295 A | 7/2005 | |

(56) References Cited

FOREIGN PATENT DOCUMENTS

| | | |
|---|---|---|
| JP | 2005-222956 A | 8/2005 |
| JP | 2005-272284 A | 10/2005 |
| JP | 2006-040722 A | 2/2006 |
| JP | 2007-113120 A | 5/2007 |
| JP | 2007-138287 A | 6/2007 |
| JP | 2007-149513 A | 6/2007 |
| JP | 2007-238402 A | 9/2007 |
| JP | 2008-230905 A | 10/2008 |
| JP | 2008-243447 A | 10/2008 |
| JP | 2009-187754 A | 8/2009 |
| JP | 2010-024506 A | 2/2010 |
| JP | 2010-097914 A | 4/2010 |
| JP | 2011-108406 A | 6/2011 |
| JP | 2011-222323 A | 11/2011 |
| JP | 2011-258348 A | 12/2011 |
| JP | 2012-046393 A | 3/2012 |
| JP | 2012-151052 A | 8/2012 |
| JP | 2013-062242 A | 4/2013 |
| JP | 2013-063539 A | 4/2013 |
| JP | 2013-076130 A | 4/2013 |
| JP | 2015-048269 A | 3/2015 |
| JP | 2015-122218 A | 7/2015 |
| JP | 2016-029193 A | 3/2016 |
| JP | 2016-047961 A | 4/2016 |
| JP | 6103499 B2 | 3/2017 |
| JP | 2017-524628 A | 8/2017 |
| JP | 2018-141762 A | 9/2018 |
| JP | 2018-190563 A | 11/2018 |
| JP | 2019-516020 A | 6/2019 |
| JP | 2020-121898 A | 8/2020 |
| JP | 2021-061089 A | 4/2021 |
| JP | 2021-061090 A | 4/2021 |
| JP | 2021-116191 A | 8/2021 |
| KR | 10-2007-0076686 A | 7/2007 |
| KR | 10-2009-0070140 A | 7/2009 |
| KR | 10-1133094 B1 | 4/2012 |
| KR | 10-2017-0039922 A | 4/2017 |
| KR | 10-2017-0045181 A | 4/2017 |
| KR | 2018-0001799 A | 1/2018 |
| KR | 10-2018-0035750 A | 4/2018 |
| KR | 10-1907912 B1 | 10/2018 |
| KR | 10-1907916 B1 | 10/2018 |
| KR | 10-1923466 B1 | 11/2018 |
| KR | 10-2101006 B1 | 4/2020 |
| KR | 10-2124946 B1 | 6/2020 |
| KR | 10-2020-0131751 A | 11/2020 |
| KR | 10-2021-0057253 A | 5/2021 |
| RU | 2744449 C1 | 3/2021 |
| TW | 521539 B | 2/2003 |
| TW | 200823313 A | 6/2008 |
| TW | I329143 B | 8/2010 |
| TW | 201411922 A | 3/2014 |
| WO | 03/77333 A1 | 9/2003 |
| WO | 2004/054017 A1 | 6/2004 |
| WO | 2004/089821 A1 | 10/2004 |
| WO | WO 2005/039752 A1 | 5/2005 |
| WO | 2006/100837 A1 | 9/2006 |
| WO | 2010/095726 A1 | 8/2010 |
| WO | 2011/090779 A2 | 7/2011 |
| WO | WO 2011/082596 A1 | 7/2011 |
| WO | 2012/023858 A1 | 2/2012 |
| WO | 2012/114108 A1 | 8/2012 |
| WO | WO 2012/144424 A1 | 10/2012 |
| WO | 2012/162743 A1 | 12/2012 |
| WO | 2013/017217 A1 | 2/2013 |
| WO | 2014/011239 A2 | 1/2014 |
| WO | 2014/110604 A2 | 7/2014 |
| WO | 2014/153318 A1 | 9/2014 |
| WO | WO 2015/064633 A1 | 5/2015 |
| WO | WO 2015/174949 A1 | 11/2015 |
| WO | WO 2016/048862 A1 | 3/2016 |
| WO | 2016/091957 A1 | 6/2016 |
| WO | 2017/074081 A1 | 5/2017 |
| WO | 2017/074084 A1 | 5/2017 |
| WO | 2017/080978 A1 | 5/2017 |
| WO | WO 2017/091543 A1 | 6/2017 |
| WO | WO 2017/106601 A8 | 6/2017 |
| WO | 2017/118955 A1 | 7/2017 |
| WO | 2017/130946 A1 | 8/2017 |
| WO | 2017/158349 A1 | 9/2017 |
| WO | 2017/178841 A1 | 10/2017 |
| WO | WO 2017/177315 A1 | 10/2017 |
| WO | WO 2017/223482 A1 | 12/2017 |
| WO | 2018/133429 A1 | 7/2018 |
| WO | WO 2018/141082 A1 | 8/2018 |
| WO | 2019/052670 A1 | 3/2019 |
| WO | WO 2019/045923 A1 | 3/2019 |
| WO | WO 2019/095039 A1 | 5/2019 |
| WO | WO 2019/139773 A1 | 7/2019 |
| WO | WO 2019/243870 A1 | 12/2019 |
| WO | WO 2019/246242 A1 | 12/2019 |
| WO | WO 2019/246257 A1 | 12/2019 |
| WO | WO 2020/009955 A1 | 1/2020 |
| WO | 2020/041767 A1 | 2/2020 |
| WO | 2020/041775 A1 | 2/2020 |
| WO | WO 2020/091854 A1 | 5/2020 |
| WO | WO 2020/132343 A1 | 6/2020 |
| WO | WO 2020/223358 A1 | 11/2020 |
| WO | WO 2020/223374 A1 | 11/2020 |
| WO | 2021/029769 A1 | 2/2021 |
| WO | WO 2021/046249 A1 | 3/2021 |
| WO | 2021/085670 A1 | 5/2021 |
| WO | 2021/115596 A1 | 6/2021 |
| WO | WO 2021/118762 A1 | 6/2021 |
| WO | WO 2021/127132 A1 | 6/2021 |
| WO | 2021/191281 A1 | 9/2021 |
| WO | 2021/245410 A1 | 12/2021 |
| WO | 2021/245411 A1 | 12/2021 |
| WO | WO 2021/263273 A1 | 12/2021 |
| WO | 2022/005999 A1 | 1/2022 |
| WO | 2022/032301 A1 | 2/2022 |
| WO | 2022/043701 A1 | 3/2022 |
| WO | 2022/043702 A1 | 3/2022 |
| WO | 2022/043704 A1 | 3/2022 |
| WO | 2022/043705 A1 | 3/2022 |
| WO | 2022/067303 A1 | 3/2022 |
| WO | 2022/075846 A1 | 4/2022 |
| WO | 2022/107907 A1 | 5/2022 |
| WO | 2022/133585 A1 | 6/2022 |
| WO | 2022/136699 A1 | 6/2022 |

OTHER PUBLICATIONS

Park et al. Preparation of spherical WTaMoNbV refractory high entropy alloy powder by inductively-coupled thermal plasma. Materials Letters 255 (2019) 126513 (Year: 2019).*
Zhang et al. High thickness tungsten coating with low oxygen content prepared by air plasma spray. Cailliao Gongcheng. (2014) (5) 23-28 (Year: 2014).*
Majewksi. Investigation of W—Re—Ni heavy alloys produced from plasma spheroidized powders. Solid State Phenomena vol. 199, pp. 448-453. Online: Mar. 18, 2013. (Year: 2013).*
DeArmitt. 26 Functional Fillers for Plastics. Applied Plastics Engineering Handbook. Elsevier. 2011. 455-468. (Year: 2011).*
Nichols. On the spheroidization of rod-shaped particles of finite length. Journal of Materials Science 11 (1976) 1077-1082. (Year: 1976).*
FR 2591412 machine translation (Year: 1987).*
CN 101391307 machine translation (Year: 2009).*
International Search Report and Written Opinion, re PCT Application No. PCT/US2020/060778, dated May 3, 2021.
"Build Boldly", Technology Demonstration, 6K Additive in 11 pages.
Ajayi, B. et al., "A rapid and scalable method for making mixed metal oxide alloys for enabling accelerated materials discovery", Journal of Materials Research, Jun. 2016, vol. 31, No. 11, pp. 1596-1607.
Bobzin, K. et al., "Modelling and Diagnostics of Multiple Cathodes Plasma Torch System for Plasma Spraying", Frontiers of Mechanical Engineering, Sep. 2011, vol. 6, pp. 324-331.

(56) References Cited

OTHER PUBLICATIONS

Bobzin, K. et al., "Numerical and Experimental Determination of Plasma Temperature during Air Plasma Spraying with a Multiple Cathodes Torch", Journal of Materials Processing Technology, Oct. 2011, vol. 211, pp. 1620-1628.

Boulos, M., "The inductively coupled radio frequency plasma", Journal of High Temperature Material Process, 1997, vol. 1, pp. 17-39.

Boulos, M., "Induction Plasma Processing of Materials for Powders, Coating, and Near-Net-Shape Parts", Advanced Materials & Processes, Aug. 2011, pp. 52-53, in 3 pages.

Boulos, M., "Plasma power can make better powders", Metal Powder Report, May 2004, vol. 59(5), pp. 16-21.

Carreon, H. et al., "Study of Aging Effects in a Ti—6Al—4V alloy with Widmanstatten and Equiaxed Microstructures by Non-destructive Means", AIP Conference Proceedings 1581, 2014 (published online Feb. 17, 2015), pp. 739-745.

Chang, S. et al., "One-Step Fast Synthesis of $Li_4Ti_5O_{12}$ Particles Using an Atmospheric Pressure Plasma Jet", Journal of the American Ceramic Society, Dec. 26, 2013, vol. 97, No. 3, pp. 708-712.

Chen, G. et al., "Spherical Ti—6Al—4V Powders Produced by Gas Atomization", Key Engineering Materials, vol. 704, Aug. 2016, pp. 287-292. URL: https://www.scientific.net/KEM.704.287.

Chikumba, S. et al., "High Entropy Alloys: Development and Applications", 7th International Conference on Latest Trends in Engineering & Technology (ICLTET'2015), Nov. 26-27, 2015, Irene, Pretoria (South Africa), pp. 13-17.

Coldwell, D. M. et al., "The reduction of $SiO_2$ with Carbon in a Plasma", Journal of Electrochemical Society, Jan. 1977, vol. 124, pp. 1686-1689.

Dolbec, R., "Recycling Spherical Powders", Presented at Titanium 2015, Orlando, FL, Oct. 2015, in 20 pages.

Fuchs, G.E. et al., "Microstructural evaluation of as-solidified and heat-treated y-TiAl based powders", Materials Science and Engineering, 1992, A152, pp. 277-282.

Gradl, P. et al., "GRCop-42 Development and Hot-fire Testing Using Additive Manufacturing Powder Bed Fusion for Channel-Cooled Combustion Chambers", 55th AIAA/SAE/ASEE Joint Propulsion Conference 2019, Aug. 2019, pp. 1-26.

He, J. Y. et al., "A precipitation-hardened high-entropy alloy with outstanding tensile properties", Acta Materialia, 2016, vol. 102, pp. 187-196.

Ivasishin, O. M. et al., "Innovative Process for Manufacturing Hydrogenated Titanium Powder for Solid State Production of P/M Titanium Alloy Components", Titanium 2010, Oct. 3-6, 2010, in 27 pages.

Jia, H. et al., "Hierarchical porous silicon structures with extraordinary mechanical strength as high-performance lithium-ion battery anodes", Nature Communications, Mar. 2020, vol. 11, in 9 pages. URL: https://doi.org/10.1038/s41467-020-15217-9.

Ko, M. et al., "Challenges in Accommodating Volume Change of Si Anodes for Li-Ion Batteries", Chem Electro Chem, Aug. 2015, vol. 2, pp. 1645-1651. URL: https://doi.org/10.1002/celc.201500254.

Kotlyarov, V. I. et al, "Production of Spherical Powders on the Basis of Group IV Metals for Additive Manufacturing", Inorganic Materials: Applied Research, Pleiades Publishing, May 2017, vol. 8, No. 3, pp. 452-458.

Laine, R. M. et al., "Making nanosized oxide powders from precursors by flame spray pyrolysis", Key Engineering Materials, Jan. 1999, vol. 159-160, pp. 17-24.

Li, X. et al., "Mesoporous silicon sponge as an anti-pulverization structure for high-performance lithium-ion battery anodes", Nature Communications, Jul. 2014, vol. 5, Article No. 4105, in 7 pages. URL: https://doi.org/10.1038/ncomms5105.

Li, L. et al., "Spheroidization of silica powders by radio frequency inductively coupled plasma with Ar—H2 and Ar—N2 as the sheath gases at atmospheric pressure", International Journal of Minerals, Metallurgy, and Materials, Sep. 2017, vol. 24(9), pp. 1067-1074.

Li, Z. et al., "Strong and Ductile Non-Equiatomic High-Entropy Alloys: Design, Processing, Microstructure, and Mechanical Properties", The Journal of The Minerals, Metals & Materials Society, Aug. 2017, vol. 69(1), pp. 2099-2106. URL: https://doi.org/10.1007/s11837-017-2540-2.

Lin, M., "Gas Quenching with Air Products' Rapid Gas Quenching Gas Mixture", Air Products, Dec. 31, 2007, in 4 pages. URL: https://www.airproducts.co.uk/-/media/airproducts/files/en/330/330-07-085-us-gas-quenching-with-air-products-rapid-gas-quenching-gas-mixture.pdf.

Moisan, M. et al., "Waveguide-Based Single and Multiple Nozzle Plasma Torches: the Tiago Concept", Plasma Sources Science and Technology, Jun. 2001, vol. 10, pp. 387-394.

Muoto, C. et al., "Phase Homogeneity in $Y_2O_3$—MgO Nanocomposites Synthesized by Thermal Decomposition of Nitrate Precursors with Ammonium Acetate Additions", Journal of the American Ceramic Society, 2011, vol. 94(12), pp. 4207-4217.

Nyutu, E. et al., "Ultrasonic Nozzle Spray in Situ Mixing and Microwave-Assisted Preparation of Nanocrystalline Spinel Metal Oxides: Nickel Ferrite and Zinc Aluminate", Journal of Physical Chemistry C, Feb. 1, 2008, vol. 112, No. 5, pp. 1407-1414.

Ohta, R. et al., "Effect of PS-PVD production throughput on Si nanoparticles for negative electrode of lithium ion batteries", Journal of Physics D: Applied Physics, Feb. 2018, vol. 51(1), in 7 pages.

Or, T. et al., "Recycling of mixed cathode lithium-ion batteries for electric vehicles: Current status and future outlook", Carbon Energy, Jan. 2020, vol. 2, pp. 6-43. URL: https://doi.org/10.1002/cey2.29.

Popescu, G. et al., "New TiZrNbTaFe high entropy alloy used for medical applications", IOP Conference Series: Materials Science and Engineering, Mod Tech 2018, Sep. 2018, vol. 400, in 9 pages.

Reig, L. et al., "Microstructure and Mechanical Behavior of Porous Ti—6Al—4V Processed by Spherical Powder Sintering", Materials, Oct. 23, 2013, vol. 6, pp. 4868-4878.

Sastry, S.M.L. et al., "Rapid Solidification Processing of Titanium Alloys", Journal of Metals (JOM), Sep. 1983, vol. 35, pp. 21-28.

Savage, S. J. et al., "Production of rapidly solidified metals and alloys", Journal of Metals (JOM), Apr. 1984, vol. 36, pp. 20-33.

Sheng, Y. et al., "Preparation of Spherical Tungsten Powder by RF Induction Plasma", Rare Metal Materials and Engineering, Nov. 2011, vol. 40, No. 11, pp. 2033-2037.

Sheng, Y. et al., "Preparation of Micro-spherical Titanium Powder by RF Plasma", Rare Metal Materials and Engineering, Jun. 2013, vol. 42, No. 6, pp. 1291-1294.

Suryanarayana, C., "Recent Developments in Mechanical Alloying", Reviews on Advanced Materials Science, Aug. 2008, vol. 18(3), pp. 203-211.

Suryanarayana, C. et al., "Rapid solidification processing of titanium alloys", International Materials Reviews, 1991, vol. 36, pp. 85-123.

Tang, H. P. et al., "Effect of Powder Reuse Times on Additive Manufacturing of Ti—6Al—4V by Selective Electron Beam Melting", JOM, Mar. 2015, vol. 67, pp. 555-563.

Van Laar, J. H. et al., "Spheroidisation of Iron Powder in a Microwave Plasma Reactor", Journal of the Southern African Institute of Mining and Metallurgy, Oct. 2016, vol. 116, No. 10, pp. 941-946.

Veith, M. et al., "Low temperature synthesis of nanocrystalline $Y_3Al_5O_{12}$ (YAG) and Cedoped $Y_3Al_5O_{12}$ via different sol-gel methods", The Journal of Materials Chemistry, Jan. 1999, vol. 9, pp. 3069-3079.

Wang, J. et al., "Preparation of Spherical Tungsten and Titanium Powders by RF Induction Plasma Processing", Rare Metals, Jun. 2015 (published online May 31, 2014), vol. 34, No. 6, pp. 431-435.

Wang, Y. et al., "Developments in Nanostructured Cathode Materials for High-Performance Lithium-Ion Batteries", Advanced Materials, Jun. 2008, pp. 2251-2269.

Yang, S. et al., "Preparation of Spherical Titanium Powders from Polygonal Titanium Hydride Powders by Radio Frequency Plasma Treatment", Materials Transactions, Nov. 2013, vol. 54, No. 12, pp. 2313-2316.

Zhang, K., Ph.D., "The Microstructure and Properties of Hipped Powder Ti Alloys", a thesis submitted to The University of Birmingham, College of Engineering and Physical Sciences, Apr. 2009, in 65 pages.

(56) References Cited

OTHER PUBLICATIONS

Zhang, Y. et al., "Microstructures and properties of high-entropy alloys", Progress in Materials Science, Apr. 2014 (available online Nov. 2013), vol. 61, pp. 1-93.

Zhang, Y. D. et al., "High-energy cathode materials for Li-ion batteries: A review of recent developments", Science China Technological Sciences, Sep. 2015, vol. 58(11), pp. 1809-1828.

Zielinski, A. et al., "Modeling and Analysis of a Dual-Channel Plasma Torch in Pulsed Mode Operation for Industrial, Space, and Launch Applications", IEEE Transactions on Plasma Science, Jul. 2015, vol. 43(7), pp. 2201-2206.

"High-entropy alloy", Wikipedia, webpage last edited Dec. 29, 2022 (accessed Jan. 17, 2023), in 16 pages. URL: https://en.wikipedia.org/wiki/High-entropy_alloy.

Barbis et al., "Titanium powders from the hydride-dehydride process." Titanium Powder Metallurgy. Butterworth-Heinemann, 2015. pp. 101-116.

Ajayi, B. P. et al., "Atmospheric plasma spray pyrolysis of lithiated nickel-manganese-cobalt oxides for cathodes in lithium ion batteries", Chemical Engineering Science, vol. 174, Sep. 14, 2017, pp. 302-310.

Gleiman, S. et al., "Melting and spheroidization of hexagonal boron nitride in a microwave-powered, atmospheric pressure nitrogen plasma", Journal of Materials Science, Aug. 2002, vol. 37(16), pp. 3429-3440.

Houmes et al., "Microwave Synthesis of Ternary Nitride Materials", Journal of Solid State Chemistry, vol. 130, Issue 2, May 1997, pp. 266-271.

International Preliminary Report on Patentability and Written Opinion, re PCT Application No. PCT/US2020/060778, dated Jun. 2, 2022.

Moldover, M. R. et al., "Measurement of the Universal Gas Constant R Using a Spherical Acoustic Resonator", Physical Review Letters, Jan. 1988, vol. 60(4), pp. 249-252.

Walter et al., "Microstructural and mechanical characterization of sol gel-derived Si—O—C glasses" Journal of the European Ceramic Society, vol. 22, Issue 13, Dec. 2002, pp. 2389-2400.

Zhang, Y. S. et al., "Core-shell structured titanium-nitrogen alloys with high strength, high thermal stability and good plasticity", Scientific Reports, Jan. 2017, vol. 7, in 8 pages.

Ali, MY., et al., Spray Flame Synthesis (SFS) of Lihium Lanrthaum Zirconate (LLZO) Solid Electroly, Materials, vol. 14, No. 13, 2021, pp. 1-13.

Bardos, L., et al., "Differences between microwave and RF activation of nitrogen for the PECVD process", J. Phys. D: Appl. Phys., vol. 15, 1982, pp. 79-82.

Bardos, L., et al., "Microwave Plasma Sources and Methods in Processing Technology", IEEE Press, 2022, 10 pages.

Choi, S. I., et al., "Continuous process of carbon nanotubes synthesis by decomposition of methane using an arc-jet plasma", Thin Solid Films, 2006, vol. 506-507, 2006, pp. 244-249.

Collin, J. E., et al., "Ionization of methane and it's electronic energy levels", Canadian Journal of Chemistry, 2011, vol. 45, No. 16, pp. 1875-1882.

Decker, J., et al., "Sample preparation protocols for realization of reproducible characterization of single-wall carbon nanotubes", Metrologia, 2009, vol. 46, No. 6, pp. 682-692.

Ding, F., et al., "Nucleation and Growth of Single-Walled Carbon Nanotubes: A Molecular Dynamics Study", J. Phys. Chem. B, vol. 108, 2004, pp. 17369-17377.

Ding, F., et al., "The Importance of Strong Carbon-Metal Adhesion for Catalytic Nucleation of Single-Walled Carbon Nanotubes", Nano Letters, 2008, vol. 8, No. 2, pp. 463-468.

Dors, M., et al., "Chemical Kinetics of Methane Pyrolysis in Microwave Plasma at Atmospheric Pressure", Plasma Chem Plasma Process, 2013, vol. 34, No. 2, pp. 313-326.

Eremin, A., et al., "The Role of Methyl Radical in Soot Formation", Combustion Science and Technology, vol. 191, No. 12, 2008, pp. 2226-2242.

Finckle, J. R., et al., "Plasma Pyrolysis of Methane to Hydrogen and Carbon Black", Industrial Engineering and Chemical Research, 2002. vol. 41, No. 6, 2002, pp. 1425-1435.

Fu, D., et al., "Direct synthesis of Y-junction carbon nanotubes by microwave-assisted pyrolysis of methane", Materials Chemistry and Physics, vol. 118, vol. 2-3, 2009, pp. 501-505.

Grace, J. et al., "Connecting particle sphericity and circularity", Particuology, vol. 54, 2021, pp. 1-4, ISSN 1674-2001, https://doi.org/10.1016/j.partic.2020.09.006. (Year: 2020).

Haghighatpanah, S., et al., "Computational studies of catalyst-free single walled carbon nanotube growth", J Chem Phys, vol. 139, No. 5, 10 pages.

Haneklaus, N., et al., "Stop Smoking—Tube-In-Tube Helical System for Flameless Calcination of Minerals," Processes, vol. 5, No. 4, Nov. 3, 2017, pp. 1-12.

Huo, H., et al., "Composite electrolytes of polyethylene oxides/garnets interfacially wetted by ionic liquid for room-temperature solid-state lithium battery", Journal of Power Sources, vol. 372, 2017, pp. 1-7.

Irle, S., et al., "Milestones in molecular dynamics simulations of single-walled carbon nanotube formation: A brief critical review", Nano Research, 2009, vol. 2, No. 10, pp. 755-767.

Jasek, O., et al., "Microwave plasma-based high temperature dehydrogenation of hydrocarbons and alcohols as a single route to highly efficient gas phase synthesis of freestanding graphene", Nanotechnology, 2021, vol. 32, 11 pages.

Jasinski, M., et al., "Atmospheric pressure microwave plasma source for hydrogen production", International Journal of Hydrogen Energy, vol. 38, Issue 26, 2013, pp. 11473-11483.

Jasinski, M., et al., "Hydrogen production via methane reforming using various microwave plasma sources", Chem. Listy, 2008, vol. 102, pp. s1332-s1337.

Kassel, L. S., "The Thermal Decomposition of Methane", Journal of the American Chemical Society, vol. 54, No. 10, 1932, pp. 3949-3961.

Kerscher, F., et al., "Low-carbon hydrogen production via electron beam plasma methane pyrolysis: Techno-economic analysis and carbon footprint assessment", International Journal of Hydrogen Energy, vol. 46, Issue 38, 2021, pp. 19897-19912.

Kim, K. S., et al., "Synthesis of single-walled carbon nanotubes by induction thermal plasma", Nano Research, 2009, vol. 2, No. 10, pp. 800-817.

Kumal, R. R., et al., "Microwave Plasma Formation of Nanographene and Graphitic Carbon Black", C, 2020, vol. 6, No. 4, 10 pages.

Lee, D. H., et al., "Comparative Study of Methane Activation Process by Different Plasma Sources", Plasma Chem. Plasma Process., vol. 33, No. 4, 2013, pp. 647-661.

Lee, D. H., et al., "Mapping Plasma Chemistry in Hydrocarbon Fuel Processing Processes", Plasma Chem. Plasma Process., vol. 33, No. 1, 2013, pp. 249-269.

Liu, Y., et al., "Advances of microwave plasma-enhanced chemical vapor deposition in fabrication of carbon nanotubes: a review", J Mater Sci., vol. 55, 2021, pp. 12559-12583.

Olsvik, O., et al, "Thermal Coupling of Methane—A Comparison Between Kinetic Model Data and Experimental Data", Thermochimica Acta., vol. 232, No. 1, 1994, pp. 155-169.

Pulsation Reactors—Thermal Processing for Extraordinary Material Properties, retrieved from https://www.ibu-tec.com/facilities/pulsation-reactors/, retrieved on Mar. 18, 2023, pp. 5.

Seehra, M. S., et al., "Correlation between X-ray diffraction and Raman spectra of 16 commercial graphene-based materials and their resulting classification", Carbon N Y., 2017, vol. 111, pp. 380-384.

Wang, H., et al., "A detailed kinetic modeling study of aromatics formation in laminar premixed acetylene and ethylene flames" Combustion and Flame, vol. 110, No. 1-2, 1997, pp. 173-221.

Zavilopulo, A. N., et al., "Ionization and Dissociative Ionization of Methane Molecules", Technical Physics, vol. 58, No. 9, 2013, pp. 1251-1257.

Zeng, X., et al., "Growth and morphology of carbon nanostructures by microwave-assisted pyrolysis of methane", Physica E., vol. 42, No. 8, 2010, pp. 2103-2108.

(56) References Cited

OTHER PUBLICATIONS

Zhang, H., et al., "Plasma activation of methane for hydrogen production in a N2 rotating gliding arc warm plasma: A chemical kinetics study", Chemical Engineering Journal, vol. 345, 2018, pp. 67-78.

Zhang, J., et al., "Flexible and ion-conducting membrane electrolytes for solid-state lithium batteries: Dispersion of garnet nanoparticles in insulating polyethylene oxide", Nano Energy, vol. 28, 2016, pp. 447-454.

Zhong, R., et al., "Continuous preparation and formation mechanism of few-layer graphene by gliding arc plasma", Chemical Engineering Journal, vol. 387, 2020, 10 pages.

* cited by examiner

UNIQUE FEEDSTOCKS FOR SPHERICAL POWDERS AND METHODS OF MANUFACTURING

REFERENCE TO RELATED APPLICATIONS

This application claims the priority benefit under 35 U.S.C. § 119(e) of U.S. Provisional Application No. 62/937,054, filed Nov. 18, 2019, the entire disclosure of which is incorporated herein by reference.

BACKGROUND

Field

The present disclosure is generally directed in some embodiments towards producing spherical or spheroidal powder products from unique feedstock materials.

Description of the Related Art

An important aspect of preparing some forms of industrial powders is the spheroidization process, which transforms irregularly shaped or angular powders produced by conventional crushing methods, into spherical low-porosity particles. Spherical powders are homogenous in shape, denser, less porous, have a high and consistent flowability, and high tap density. Such powders exhibit superior properties in applications such as injection molding, thermal spray coatings, additive manufacturing, etc.

Conventional spheroidization methods employ thermal arc plasma described in U.S. Pat. No. 4,076,640 issued Feb. 28, 1978 and radio-frequency generated plasma described in U.S. Pat. No. 6,919,527 issued Jul. 19, 2005. However, these two methods present limitations inherent to the thermal non-uniformity of radio-frequency and thermal arc plasmas.

In the case of thermal arc plasma, an electric arc is produced between two electrodes generates a plasma within a plasma channel. The plasma is blown out of the plasma channel using plasma gas. Powder is injected from the side, either perpendicularly or at an angle, into the plasma plume, where it is melted by the high temperature of the plasma. Surface tension of the melt pulls it into a spherical shape, then it is cooled, solidified and is collected in filters. An issue with thermal arc plasma is that the electrodes used to ignite the plasma are exposed to the high temperature causing degradation of the electrodes, which contaminates the plasma plume and process material. In addition, thermal arc plasma plume inherently exhibit large temperature gradient. By injecting powder into the plasma plume from the side, not all powder particles are exposed to the same process temperature, resulting in a powder that is partially spheroidized, non-uniform, with non-homogeneous porosity.

In the case of radio-frequency inductively coupled plasma spheroidization, the plasma is produced by a varying magnetic field that induces an electric field in the plasma gas, which in turn drives the plasma processes such as ionization, excitation, etc. to sustain the plasma in cylindrical dielectric tube. Inductively coupled plasmas are known to have low coupling efficiency of the radio frequency energy into the plasma and a lower plasma temperature compared to arc and microwave generated plasmas. The magnetic field responsible for generating the plasma exhibits a non-uniform profile, which leads to a plasma with a large temperature gradient, where the plasma takes a donut-like shape that exhibiting the highest temperature at the edge of the plasma (close to the dielectric tube walls) and the lowest temperature in the center of the donut. In addition, there is a capacitive component created between the plasma and the radio frequency coils that are wrapped around the dielectric tube due to the RF voltage on the coils. This capacitive component creates a large electric field that drives ions from the plasma towards the dielectric inner walls, which in turn leads to arcing and dielectric tube degradation and process material contamination by the tube's material.

SUMMARY

Disclosed herein are embodiments for spheroidizing unique feedstock materials using microwave plasma processing. In one aspect, a method for producing a spheroidized powder from a feed material including Yttrium Stabilized Zirconia (YSZ) is provided. The method includes: introducing a feed material including YSZ particles into a microwave plasma torch; and melting and spheroidizing the particles within a plasma generated by the microwave plasma torch to form spheroidized powder.

In another aspect, a method for producing a spheroidized powder from a feed material including Aluminum (Al) or Al alloy is provided. The method includes: introducing a feed material including Al or Al alloy particles into a microwave plasma torch; and melting and spheroidizing the particles within a plasma generated by the microwave plasma torch to form spheroidized powder. In some embodiments, the Al or Al alloy includes Al 6000 series or Aluminum Silicon Magnesium (AlSiMg). The AlSiMg can be AlSi10Mg.

In another aspect, a method for producing a spheroidized powder from a feed material including water atomized alloy is provided. The method including: introducing a feed material including water atomized alloy into a microwave plasma torch; and melting and spheroidizing the particles within a plasma generated by the microwave plasma torch to form spheroidized powder. In some embodiments, the water atomized alloy includes metal injection molded (MIM) 17-4 Stainless Steel. In some embodiments, the water atomized alloy includes Inconel Alloy 625 (IN625).

In another aspect, a method for producing a spheroidized powder from a feed material including Tantalum (Ta) is provided. The method includes: introducing a feed material including Ta particles into a microwave plasma torch; and melting and spheroidizing the particles within a plasma generated by the microwave plasma torch to form spheroidized powder.

In another aspect, a method for producing a spheroidized powder from a feed material including Titanium Nitride (TiN) is provided. The method includes: introducing a feed material including TiN particles into a microwave plasma torch; and melting and spheroidizing the particles within a plasma generated by the microwave plasma torch to form spheroidized powder.

In another aspect, a method for producing a spheroidized powder from a feed material including Rhenium (Re) is provided. The method including: introducing a feed material including Re particles into a microwave plasma torch; and melting and spheroidizing the particles within a plasma generated by the microwave plasma torch to form spheroidized powder.

In another aspect, a method for producing a spheroidized powder from a feed material including Tungsten (W) is provided. The method including: introducing a feed material including W particles into a microwave plasma torch; and melting and spheroidizing the particles within a plasma generated by the microwave plasma torch to form spheroidized powder.

In another aspect, a method for producing a spheroidized powder from a feed material including Molybdenum (Mo) is provided. The method includes: introducing a feed material including Mo particles into a microwave plasma torch; and melting and spheroidizing the particles within a plasma generated by the microwave plasma torch to form spheroidized powder.

In various embodiments, the introducing the feed material into the microwave plasma torch can include introducing the feed material into an exhaust of the microwave plasma torch or into a plume of the microwave plasma torch.

In various embodiments, the collective average or median aspect ratio of the feed material may be between 5:1 to 20:1. In various embodiments, the method further includes sieving the feed material before introducing the feed material into the microwave plasma torch. In various embodiments, the spheroidized powder may have a medium sphericity of at least 0.75. In various embodiments, the spheroidized powder may have a medium sphericity of at least 0.91. In various embodiments, the spheroidized powder may have a particle size distribution of 15 to 45 microns. In various embodiments, the spheroidized powder may have a particle size distribution of 45 to 105 microns.

Further disclosed is a method of producing spheroidized powder as disclosed herein and a spheroidized powder as disclosed herein.

APPENDIX

Figure 1:
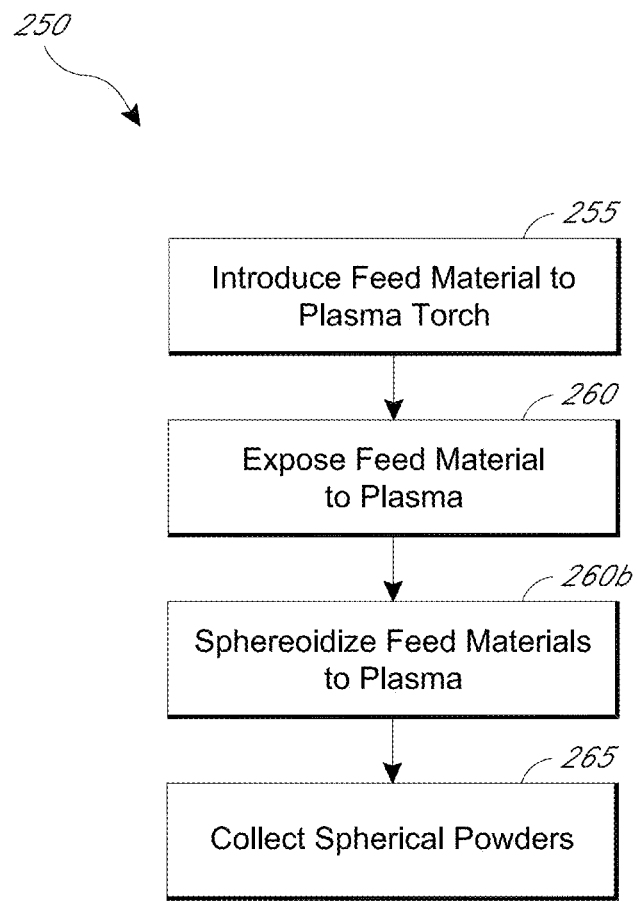
FIG. 1 illustrates an example embodiment of a method of producing spheroidal particles according to the present disclosure.

This specification includes Appendix A provided herewith in 11 pages. Any suitable combination of features described in Appendix A can be implemented in combination with the subject matter described herein.

DETAILED DESCRIPTION

Disclosed herein are embodiments of methods, devices, and assemblies for spheroidization of feedstock materials using microwave plasma processing. The feedstocks disclosure herein are a number of metals and ceramics, each of which have their own critical, specialized, and unique requirements for the initial feedstock as well as the processing in a microwave plasma torch in order to achieve a desired spheroidization.

As disclosed herein, processing in a microwave plasma torch can include feeding the feedstock into a microwave plasma torch, a plasma plume of the microwave plasma torch, and/or an exhaust of the microwave plasma torch. The location may vary depending on the type of feedstock used. Further the feedstock can be selected based on different requirements. Examples of requirements are aspect ratio, particle size distribution (PSD), chemistry, density, diameter, sphericity, oxygenation, hardness, and ductility.

The feedstock can then be used as a feedstock for a microwave plasma process to form a final spheroidized powder, which can then be used in different processes, such as additive manufacturing processes. However, the particular feedstock materials disclosed herein are extremely difficult to process into a proper feedstock for microwave plasma processing.

In some embodiments, the powders may be pre-processed before they are introduced into the plasma process. For example, the powders may be sieved to remove large agglomerations and selected the desired size to be processed in the plasma. In some embodiments, the powders may be cleaned with water, surfactant, detergent, solvent or any other chemical such as acids to remove contamination. In some embodiments, the powders may be magnetically cleaned if they are contaminated with any magnetic material. In some embodiments, the powder can be pre-treated to de-oxidize it. In some embodiments, other elements or compounds can be added to compensate or modify the chemistry of the powder. In some embodiments, the powder can be de-dusted to remove fines. In some embodiments, no pre-processing may be performed.

In some embodiments, particle size distribution (PSD) is with a minimum diameter of 1 micrometers (μm) and a maximum diameter of 22 (or about 22) μm, or a minimum of 5 (or about 5) μm and a maximum of 15 (or about 15) μm, or a minimum of 15 (or about 15) μm and a maximum of 45 (or about 45) μm or a minimum of 22 (or about 22) μm and a maximum of 44 (or about 44) μm, or a minimum of 20 (or about 20) μm to a maximum of 63 (or about 63) μm, or a minimum of 44 (or about 44) μm and a maximum of 70 (or about 70) μm, or a minimum of 70 (or about 70) μm and a maximum of 106 (or about 106) μm, or a minimum of 105 (or about 105) μm to a maximum of 150 (or about 150) μm, or a minimum of 106 (or about 106) μm and a maximum of 300 (or about 300) μm. In some embodiments, the PSD can be expressed as the D50 of the particles in the feedstock. As will be appreciated, these upper and lower values are provided for illustrative purposes only, and alternative PSD values may be used in other embodiments.

In some embodiments, the powder feedstock can have be angular or have a high aspect ratio before plasma processing. In some embodiments, the average aspect ratio of the powder feedstock is 2:1 (or about 2:1), 3:1 (or about 3:1), 5:1 (or about 5:1), 10:1 (or about 10:1), 20:1 (or about 20:1), 100:1 (or about 100:1), or 200:1 (or about 200:1). In some embodiments, the average aspect ratio of the powder feedstock is greater than 1:1 (or about 1:1), 3:1 (or about 3:1), 5:1 (or about 5:1), greater 10:1 (or about 10:1), greater 20:1 (or about 20:1), greater 100:1 (or about 100:1), or greater 200:1 (or about 200:1). In some embodiments, the average aspect ratio of the powder feedstock is less than, 3:1 (or about 3:1), 5:1 (or about 5:1), greater 10:1 (or about 10:1), greater 20:1 (or about 20:1), greater 100:1 (or about 100:1), or greater 200:1 (or about 200:1).

Tantalum (Ta) Feedstock

Tantalum (Ta) or Ta alloy powder can be used in various applications. Applications of Ta or Ta alloy powder can benefit from a narrow particle size distribution and a high sphericity. It has been observed that microwave plasma processing of Ta or Ta alloy powder feedstock can yield a narrow particle size distribution and a high sphericity Ta or Ta alloy powder. Before plasma processing, the feedstock can be sieved to remove large agglomerations and selected the desired size to be processed in the plasma. Ta7300 is high purity Tantalum spherical powder that may be synthesized according to the embodiments herein for use in various applications including additive manufacturing. Ta has high electrical and thermal conductivity, biocompatibility and high corrosion resistance. In some embodiments, as an example, a Ta or TA alloy powder may comprise an apparent density of about 9 g/cc, a flow of about 7 s/50 g, a D10 of about 15 mm, a D50 of about 30 mm, and D90 of about 55 mm.

Yttrium Stabilized Zirconia (YSZ) Feedstock

Yttrium Stabilized Zirconia (YSZ) powder can be used in various applications. Applications of YSZ powder can benefit from a narrow particle size distribution and a high sphericity. It has been observed that microwave plasma processing of YSZ powder feedstock can yield a narrow particle size distribution and a high sphericity. Before plasma processing, the feedstock can be sieved to remove large agglomerations and selected the desired size to be processed in the plasma. In some embodiments, 8% YSZ may be synthesized, which is a high purity yttria stabilized zirconia spherical powder. In some embodiments, a microwave plasma treatment produces highly spherical powder with substantially no satellites. In some embodiments, YSZ powder synthesized according to the embodiments herein may comprise a composition about 8 mol % $Y_2O_3$ and about 92 mol % $ZrO_2$, with particle sizes ranging from about 15 microns to about 45 microns. In some embodiments, as an example, the apparent density may be about 3.12 g/cc and the flow may be about 23 s/50 g Titanium Nitride (TiN) Feedstock Titanium Nitride (TiN) powder can be used in various applications. Applications of TiN powder can benefit from a narrow particle size distribution and a high sphericity. It has been observed that microwave plasma processing of TiN powder feedstock can yield a narrow particle size distribution and a high sphericity. Before plasma processing, the feedstock can be sieved to remove large agglomerations and selected the desired size to be processed in the plasma. In some embodiments, TiN powder may be synthesized with substantially no satellites, high Sphericity, high flowability, high bulk density, and low interstitials. In some embodiments, as an example, TiN powder synthesized according to the embodiments herein may comprise an apparent density of about 2.7 g/cc, a flow of about 31 s/50 s, a D10 of about 18 mm, a D50 of about 35 mm, and a D90 of about 52 mm.

Aluminum Feedstock

Aluminum (Al) or Al alloy powders can be used in various applications. Specifically, Al 6000 series and Aluminum Silicon Magnesium (AlSiMg) powder has been demonstrated to be useful in various applications. Applications of Al 6000 series or AlSiMg powder can benefit from a narrow particle size distribution and a high sphericity. It has been observed that microwave plasma processing of AlSiMg powder feedstock can yield a narrow particle size distribution and a high sphericity. Before plasma processing, the feedstock can be sieved to remove large agglomerations and selected the desired size to be processed in the plasma. AlSiMg powder can be AlSi10Mg powder which includes a Silicon content of about 9% to about 11%. AlSi10Mg is a lightweight Aluminum alloy designed specifically for use in Additive Manufacturing. This alloy has a high strength to weight ratio and excellent corrosion resistance. In some embodiments, a Al or Al alloy powders synthesized according to the embodiments herein may comprise a composition of about 9.0-11.0% Si, about 0.25-0.45% Mg, about 0.25% or less Fe, about 0.20% or less N, about 0.20% or less 0, about 0.15% or less Ti, about 0.10% or less Zn, about 0.10% or less Mn, and the balance Al. As an example, an Al or Al alloy powder according to the embodiments herein may comprise a particle size of about 20-63 microns, an apparent density of about 1.4 g/cc, and a flow of about 40 s/50 g.

Water Atomized Alloy Feedstock

Water atomized alloy powders can be used in various applications. Specifically, water atomized metal injection molded (MIM) 17-4 Stainless Steel powder and water atomized Inconel Alloy 625 (IN625) powder has been demonstrated to be useful is various applications. Applications of water atomized alloy powders can benefit from a narrow particle size distribution and a high sphericity. It has been observed that microwave plasma processing of water atomized MIM 17-4 Stainless Steel powder feedstock and water atomized IN625 powder feedstock can yield a narrow particle size distribution and a high sphericity. Before plasma processing, the feedstock can be sieved to remove large agglomerations and selected the desired size to be processed in the plasma. As an example, in some embodiments, a MIM 17-4 powder may comprise an apparent density of about 4.2 g/cc, a flow of about 17 s/50 g, a D10 of about 18 mm, a D50 of about 32 mm, and a D90 of about 56 mm. In some embodiments, a MIM 17-4 powder synthesized according to the embodiments herein may comprise about 17% Cr, about 4.5% Ni, about 4% Cu, about 0.30% of Nb and Ta combined, about 0.07% or less C, and the balance Fe.

As an example, in some embodiments, IN625 powder may comprise about 0.10% or less C, about 0.015% or less P, about 0.50% or less Si, about 0.50% or less Cu, about 0.40% Ti, about 0.40% Al, about 0.03% or less 0, about 3.15%-4.15% Ni and Ta combined, about 0.50% or less Mn, about 20.0%-23.0% Cr, about 8.00-10.00% Mo, about 1.00% or less Co, about 0.02% or less Ni, about 5.0% or less Fe, and the balance Nickel. As an example, in some embodiments, IN625 powder may comprise an apparent density of about 4.3 g/cc, a tap density of about 5 g/cc, a flow of about 15 s/50 g, a D10 of about 16-26 mm, a D50 of about 26-37 mm, and a D90 of about 37-49 mm.

Rhenium Feedstock

Rhenium (Re) or Re alloy powder can be used in various applications. Applications of Re or Re alloy powder can benefit from a narrow particle size distribution and a high sphericity. It has been observed that microwave plasma processing of Re or Re alloy powder feedstock can yield a narrow particle size distribution and a high sphericity Re or Re alloy powder. Before plasma processing, the feedstock can be sieved to remove large agglomerations and selected the desired size to be processed in the plasma. In some embodiments, the Re or Re alloy powder may comprise Re7500. As an example, in some embodiments, an Re or Re alloy powder may comprise over 99.9% Re, particle sizes between 20-63 microns, an apparent density of about 11.4 g/cc, a flow of about 4.3 s/50 g, a D10 of about 29 microns, a D50 of about 39 microns, and a D90 of about 55 microns.

Tungsten Feedstock

Tungsten (W) or W alloy powder can be used in various applications. Applications of W or W alloy powder can benefit from a narrow particle size distribution and a high sphericity. It has been observed that microwave plasma processing of W or W alloy powder feedstock can yield a narrow particle size distribution and a high sphericity W or W alloy powder. Before plasma processing, the feedstock can be sieved to remove large agglomerations and selected the desired size to be processed in the plasma. In some embodiments, the W or W alloy powder may comprise W7400. As an example, in some embodiments, a W or W alloy powder may comprise over 90.9% W, or preferably over 99.9% W. As an example, in some embodiments, a W or W alloy powder may comprise particle sizes between 20-63 microns, an apparent density of about 11.2 g/cc, a flow of about 5.16 s/50 g, a D10 of about 29 microns, a D50 of about 39 microns, and a D90 of about 55 microns.

Molybdenum Feedstock

Molybdenum (Mo) or Mo alloy powder can be used in various applications. Applications of Mo or Mo alloy powder can benefit from a narrow particle size distribution and a high sphericity. It has been observed that microwave plasma processing of Mo or Mo alloy powder feedstock can yield a narrow particle size distribution and a high sphericity Mo or Mo alloy powder. Before plasma processing, the feedstock can be sieved to remove large agglomerations and selected the desired size to be processed in the plasma. In some embodiments, the Mo or Mo alloy powder may comprise Mo4200. As an example, in some embodiments, the Mo or Mo alloy powder may comprise over 99.9% Mo. As an example, in some embodiments, the Mo or Mo alloy powder may comprise particle sizes between 15-45 microns, an apparent density of about 5.5 g/cc, and a flow of about 11.7 s/50 g.

Sphericity

In some embodiments, the final particles achieved by the plasma processing can be spherical or spheroidal, terms which can be used interchangeably. Advantageously, by using the critical and specific disclosure relevant to each of the different feedstocks disclosed, all of the feedstocks can be transformed into the spherical powders.

Embodiments of the present disclosure are directed to producing particles that are substantially spherical or spheroidal or have undergone significant spheroidization. In some embodiments, spherical, spheroidal or spheroidized particles refer to particles having a sphericity greater than a certain threshold. Particle sphericity can be calculated by calculating the surface area of a sphere $A_{s,ideal}$ with a volume matching that of the particle, V using the following equation:

$$r_{ideal} = \sqrt[2]{\frac{3V}{4\pi}}$$

$$A_{s,ideal} = 4\pi r_{ideal}^2$$

The idealized surface area can be compared with the measured surface area of the particle, $A_{s,actual}$:

$$\text{sphericity} = \frac{A_{s,ideal}}{A_{s,actual}}.$$

In some embodiments, particles can have a sphericity of greater than 0.5, 0.6, 0.7, 0.75, 0.8, 0.9, 0.91, 0.95, or 0.99 (or greater than about 0.5, about 0.6, about 0.7, about 0.75, about 0.8, about 0.8, about 0.91, about 0.95, or about 0.99). In some embodiments, particles can have a sphericity of 0.75 or greater or 0.91 or greater (or about 0.75 or greater or about 0.91 or greater). In some embodiments, particles can have a sphericity of less than 0.5, 0.6, 0.7, 0.75, 0.8, 0.9, 0.91, 0.95, or 0.99 (or less than about 0.5, about 0.6, about 0.7, about 0.75, about 0.8, about 0.8, about 0.91, about 0.95, or about 0.99). In some embodiments, a particle is considered to be spherical, spheroidal or spheroidized if it has a sphericity at or above any of the aforementioned sphericity values, and in some preferred embodiments, a particle is considered to be spherical if its sphericity is at or about 0.75 or greater or at or about 0.91 or greater.

In some embodiments, a median sphericity of all particles within a given powder can be greater than 0.5, 0.6, 0.7, 0.75, 0.8, 0.9, 0.91, 0.95, or 0.99 (or greater than about 0.5, about 0.6, about 0.7, about 0.75, about 0.8, about 0.8, about 0.91, about 0.95, or about 0.99). In some embodiments, a median sphericity of all particles within a given powder can be less than 0.5, 0.6, 0.7, 0.75, 0.8, 0.9, 0.91, 0.95, or 0.99 (or less than about 0.5, about 0.6, about 0.7, about 0.75, about 0.8, about 0.8, about 0.91, about 0.95, or about 0.99). In some embodiments, a powder is considered to be spheroidized if all or a threshold percentage (as described by any of the fractions below) of the particles measured for the given powder have a median sphericity greater than or equal to any of the aforementioned sphericity values, and in some preferred embodiments, a powder is considered to be spheroidized if all or a threshold percentage of the particles have a median sphericity at or about 0.75 or greater or at or about 0.91 or greater.

In some embodiments, the fraction of particles within a powder that can be above a given sphericity threshold, such as described above, can be greater than 50%, 60%, 70%, 80%, 90%, 95%, or 99% (or greater than about 50%, about 60%, about 70%, about 80%, about 90%, about 95%, or about 99%). In some embodiments, the fraction of particles within a powder that can be above a given sphericity threshold, such as described above, can be less than 50%, 60%, 70%, 80%, 90%, 95%, or 99% (or less than about 50%, about 60%, about 70%, about 80%, about 90%, about 95%, or about 99%).

Particle size distribution and sphericity may be determined by any suitable known technique such as by SEM, optical microscopy, dynamic light scattering, laser diffraction, manual measurement of dimensions using an image analysis software, for example from about 15-30 measures per image over at least three images of the same material section or sample, and any other techniques.

Embodiments of the disclosed process can include feeding the powders using a powder feeder into a microwave generated plasma where the power density, gas flows and residence time are controlled. The process parameters such as power density, flow rates and residence time of the powder in the plasma can depend on the powder material's physical characteristics, such as the melting point and thermal conductivity. The power density can range from 20 W/cm³ to 500 W/cm³ (or about 20 W/cm³ to about 500 W/cm³). The total gas flows can range from 0.1 cfm to 50 cfm (or about 0.1 cfm to about 50 cfm), and the residence time can be tuned from 1 ms to 10 sec (or about 1 ms to about 10 sec). This range of process parameters will cover the required processing parameters for materials with a wide range of melting point and thermal conductivity.

In some embodiments, the ability to control oxygen can provide advantages. In some embodiments where the material is milled, the milling can be done in water. Different environmental gasses can be used for different applications. As an example, nitrogen gas can be used.

In some embodiments, the feedstock could be of various morphology such as angular powder, angular chips, irregular powder, and sponge powders. The feedstock can be processed to meet certain criteria for size, gas content, purity contamination and chemistry by processing such as but not limited to grinding, milling, cleaning, washing, drying and screening. The cleaning includes removing organic, ceramic, or other contaminants.

Microwave Plasma Processing

The process parameters can be optimized to obtain maximum spheroidization depending on the feedstock initial condition. For each feedstock characteristic, process parameters can be optimized for a particular outcome. U.S. Pat. Pub. No. 2018/0297122, U.S. Pat. No. 8,748,785 B2, and U.S. Pat. No. 9,932,673 B2 disclose certain processing techniques that can be used in the disclosed process, specifically for microwave plasma processing. Accordingly, U.S. Pat. Pub. No. 2018/0297122, U.S. Pat. No. 8,748,785 B2, and U.S. Pat. No. 9,932,673 B2 are incorporated by reference in its entirety and the techniques describes should be considered to be applicable to the feedstock described herein.

One aspect of the present disclosure involves a process of spheroidization using a microwave generated plasma. The powder feedstock is entrained in an inert and/or reducing gas environment and injected into the microwave plasma environment. Upon injection into a hot plasma (or plasma plume or exhaust), the feedstock is spheroidized and released into a chamber filled with an inert gas and directed into hermetically sealed drums where is it stored. This process can be carried out at atmospheric pressure, in a partial vacuum, or at a slightly higher pressure than atmospheric pressure. In alternative embodiments, the process can be carried out in a low, medium, or high vacuum environment. The process can run continuously and the drums are replaced as they fill up with spheroidized particles.

Cooling processing parameters include, but are not limited to, cooling gas flow rate, residence time of the spheroidized particles in the hot zone, and the composition or make of the cooling gas. For example, the cooling rate or quenching rate of the particles can be increased by increasing the rate of flow of the cooling gas. Residence time of the particles within the hot zone of the plasma can also be adjusted to provide control. That is, the length of time the particles are exposed to the plasma determines the extent of melting of the particle (i.e., surface of the particle melted as compared to the inner most portion or core of the particle). Consequently, the extent of melting effects the extent of cooling needed for solidification and thus it is a cooling process parameter. Residence time can be adjusted by adjusting such operating variables of particle injection rate and flow rate (and conditions, such as laminar flow or turbulent flow) within the hot zone. Equipment changes can also be used to adjust residence time. For example, residence time can be adjusted by changing the cross-sectional area of the hot zone.

Another cooling processing parameter that can be varied or controlled is the composition of the cooling gas. Certain cooling gases are more thermally conductive than others. For example helium is considered to be a highly thermally conductive gas. The higher the thermal conductivity of the cooling gas, the faster the spheroidized particles can be cooled/quenched. By controlling the composition of the cooling gas (e.g., controlling the quantity or ratio of high thermally conductive gasses to lesser thermally conductive gases) the cooling rate can be controlled.

In one exemplary embodiment, inert gas is continually purged surrounding a powdered feed to remove oxygen within a powder-feed hopper. A continuous volume of powder feed is then entrained within an inert gas and fed into the microwave generated plasma for dehydrogenation or for composition/maintaining purity of the spheroidized particles. In one example, the microwave generated plasma may be generated using a microwave plasma torch, as described in U.S. Patent Publication No. US 2013/0270261, and/or U.S. Pat. Nos. 8,748,785, 9,023,259, 9,259,785, and 9,206,085, each of which is hereby incorporated by reference in its entirety. In some embodiments, the particles are exposed to a uniform temperature profile at between 4,000 and 8,000 K within the microwave generated plasma. In some embodiments, the particles are exposed to a uniform temperature profile at between 3,000 and 8,000 K within the microwave generated plasma. In some embodiments, the microwave generated plasma may be generated by using an argon and hydrogen ($H_2$) mixture. In some embodiments, the microwave generated plasma may be generated by using a nitrogen ($N_2$) gas. At times, the microwave generated plasma using $N_2$ gas may be larger, more stable, and more laminar than the microwave generated plasma using an argon and $H_2$ mixture which can allow for a higher plasma temperature to be achieved. For certain feedstocks, a higher temperature plasma can be beneficial due to their high melting temperature. For example, YSZ, W, and Mo have high melting temperatures and therefore can benefit from a higher temperature plasma. For these feedstocks, it could be advantageous to use a microwave generated plasma using $N_2$ gas.

Within the plasma torch, the powder particles are rapidly heated and melted. As the particles within the process are entrained within an inert gas, such as argon, generally contact between particles is minimal, greatly reducing the occurrence of particle agglomeration. The need for post-process sifting is thus greatly reduced or eliminated, and the resulting particle size distribution could be practically the same as the particle size distribution of the input feed materials. In exemplary embodiments, the particle size distribution of the feed materials is maintained in the end products.

Within the plasma, plasma plume, or exhaust, the materials are inherently spheroidized due to liquid surface tension. As the microwave generated plasma exhibits a substantially uniform temperature profile, more than 90% spheroidization of particles could be achieved (e.g., 91%, 93%, 95%, 97%, 99%, 100%). After exiting the plasma, the particles are cooled before entering collection bins. When the collection bins fill, they can be removed and replaced with an empty bin as needed without stopping the process.

In one exemplary embodiment, inert gas is continually purged surrounding a feed to remove oxygen within a powder-feed hopper. A continuous volume of powder feed is then entrained within an inert gas and fed into the microwave generated plasma for composition/maintaining purity of the spheroidized particles. In one example, the microwave generated plasma may be generated using a microwave plasma torch, as described in U.S. Patent Publication No. US 2013/0270261, and/or U.S. Pat. No. 8,748,785, each of which is hereby incorporated by reference in its entirety. In some embodiments, the particles are exposed to a uniform temperature profile at between 4,000 and 8,000 K within the microwave generated plasma. Within the plasma torch, the powder particles are rapidly heated and melted. As the particles within the process are entrained within an inert gas, such as argon, generally contact between particles is minimal, greatly reducing the occurrence of particle agglomeration. The need for post-process sifting is thus greatly reduced or eliminated, and the resulting particle size distribution could be practically the same as the particle size distribution of the input feed materials. In exemplary embodiments, the particle size distribution of the feed materials is maintained in the end products.

Within the plasma, the feedstock is inherently spheroidized due to liquid surface tension. As the microwave generated plasma exhibits a substantially uniform temperature profile, more than 90% spheroidization of particles could be achieved (e.g., 91%, 93%, 95%, 97%, 99%, 100%). In embodiments, both spheroidization and tailoring (e.g., changing, manipulating, controlling) microstructure are addressed or, in some instances, partially controlled, by treating with the microwave generated plasma. After exiting the plasma, the particles are cooled before entering collection bins. When the collection bins fill, they can be removed and replaced with an empty bin as needed without stopping the process.

FIG. 1 is a flow chart illustrating an exemplary method (250) for producing spherical powders, according to an embodiment of the present disclosure. In this embodiment, the process (250) begins by introducing a feed material into a plasma torch (255). In some embodiments, the plasma torch is a microwave generated plasma torch or an RF plasma torch. Within the plasma torch, the feed materials are exposed to a plasma causing the materials to melt, as described above (260). The melted materials are spheroidized by surface tension, as discussed above (260b). After exiting the plasma, the products cool and solidify, locking in the spherical shape and are then collected (265).

As discussed above, the plasma torch can be a microwave generated plasma or an RF plasma torch. In one example embodiment, an AT-1200 rotating powder feeder (available from Thermach Inc.) allows a good control of the feed rate of the powder. In an alternative embodiment, the powder can be fed into the plasma using other suitable means, such as a fluidized bed feeder. The feed materials may be introduced at a constant rate, and the rate may be adjusted such that particles do not agglomerate during subsequent processing steps. In another exemplary embodiment, the feed materials to be processed are first sifted and classified according to their diameters, with a minimum diameter of 1 micrometers (µm) and a maximum diameter of 22 µm, or a minimum of 5 µm and a maximum of 15 µm, or a minimum of 15 µm and a maximum of 45 µm or a minimum of 22 µm and a maximum of 44 µm, or a minimum of 20 µm to a maximum of 63 µm, or a minimum of 44 µm and a maximum of 70 µm, or a minimum of 70 µm and a maximum of 106 µm, or a minimum of 105 µm to a maximum of 150 µm, or a minimum of 106 µm and a maximum of 300 µm. As will be appreciated, these upper and lower values are provided for illustrative purposes only, and alternative size distribution values may be used in other embodiments. This eliminates recirculation of light particles above the hot zone of the plasma and also ensures that the process energy present in the plasma is sufficient to melt the particles without vaporization. Pre-screening allows efficient allocation of microwave power necessary to melt the particles without vaporizing material.

In some embodiments, the environment and/or sealing requirements of the bins are carefully controlled. That is, to prevent contamination or potential oxidation of the powders, the environment and or seals of the bins are tailored to the application. In one embodiment, the bins are under a vacuum. In one embodiment, the bins are hermetically sealed after being filled with powder generated in accordance with the present technology. In one embodiment, the bins are back filled with an inert gas, such as, for example argon. Because of the continuous nature of the process, once a bin is filled, it can be removed and replaced with an empty bin as needed without stopping the plasma process.

Figure 2:
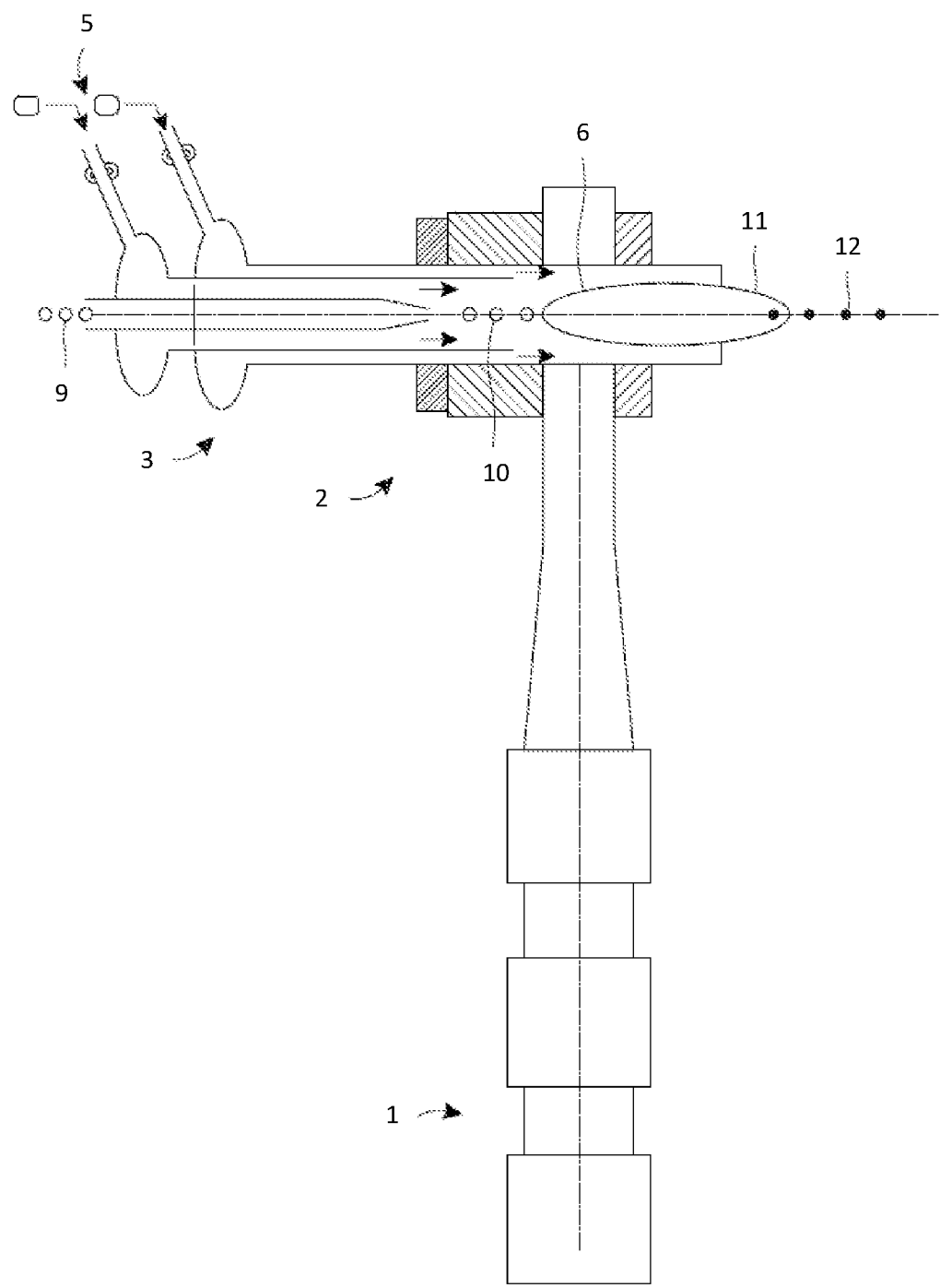
FIG. 2 illustrates an embodiment of a microwave plasma torch that can be used in the production of spheroidal powders, according to embodiments of the present disclosure.

FIG. 2 illustrates an exemplary microwave plasma torch that can be used in the production of spheroidal powders, according to embodiments of the present disclosure. As discussed above, feed materials 9, 10 can be introduced into a microwave plasma torch 3, which sustains a microwave generated plasma 11. In one example embodiment, an entrainment gas flow and a sheath flow (downward arrows) may be injected through inlets 5 to create flow conditions within the plasma torch prior to ignition of the plasma 11 via microwave radiation source 1. In some embodiments, the entrainment flow and sheath flow are both axis-symmetric and laminar, while in other embodiments the gas flows are swirling. The feed materials 9 are introduced axially into the microwave plasma torch, where they are entrained by a gas flow that directs the materials toward the plasma. As discussed above, the gas flows can consist of a noble gas column of the periodic table, such as helium, neon, argon, etc. Within the microwave generated plasma, the feed materials are melted in order to spheroidize the materials. Inlets 5 can be used to introduce process gases to entrain and accelerate particles 9, 10 along axis 12 towards plasma 11. First, particles 9 are accelerated by entrainment using a core laminar gas flow (upper set of arrows) created through an annular gap within the plasma torch. A second laminar flow (lower set of arrows) can be created through a second annular gap to provide laminar sheathing for the inside wall of dielectric torch 3 to protect it from melting due to heat radiation 6 from plasma 11. In exemplary embodiments, the laminar flows direct particles 9, 10 toward the plasma 11 along a path as close as possible to axis 12, exposing them to a substantially uniform temperature within the plasma. In some embodiments, suitable flow conditions are present to keep particles 10 from reaching the inner wall of the plasma torch 3 where plasma attachment could take place. Particles 9, 10 are guided by the gas flows towards microwave plasma 11 were each undergoes homogeneous thermal treatment. Various parameters of the microwave generated plasma, as well as particle parameters, may be adjusted in order to achieve desired results. These parameters may include microwave power, feed material size, feed material insertion rate, gas flow rates, plasma temperature, residence time and cooling rates. In some embodiments, the cooling or quenching rate is not less than $10^{+3}$ degrees C./sec upon exiting plasma 11. As discussed above, in this particular embodiment, the gas flows are laminar; however, in alternative embodiments, swirl flows or turbulent flows may be used to direct the feed materials toward the plasma.

Figure 3A:
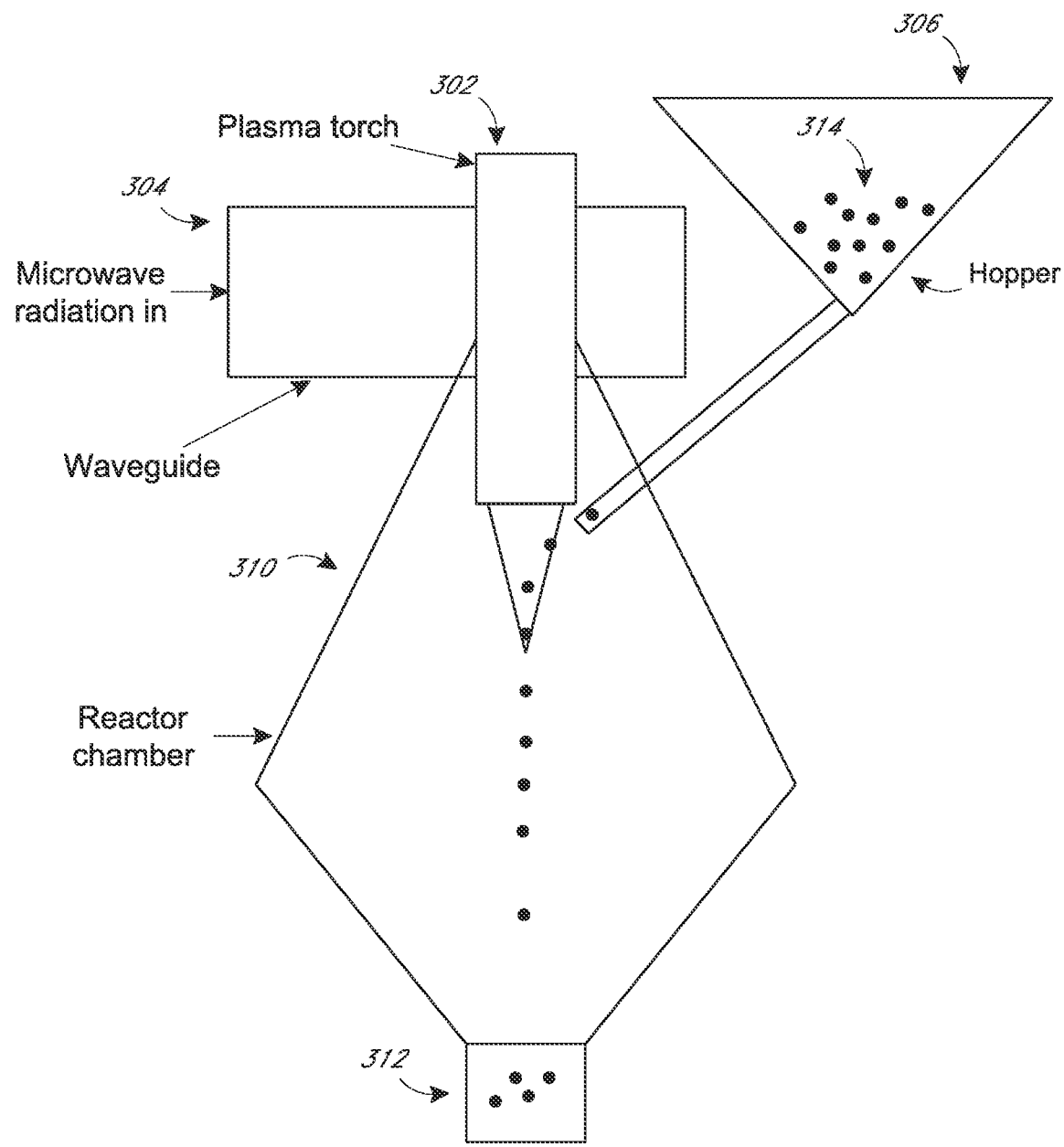
FIGS. 3A-B illustrate embodiments of a microwave plasma torch that can be used in the production of spheroidal powders, according to a side feeding hopper embodiment of the present disclosure.
Figure 3B:
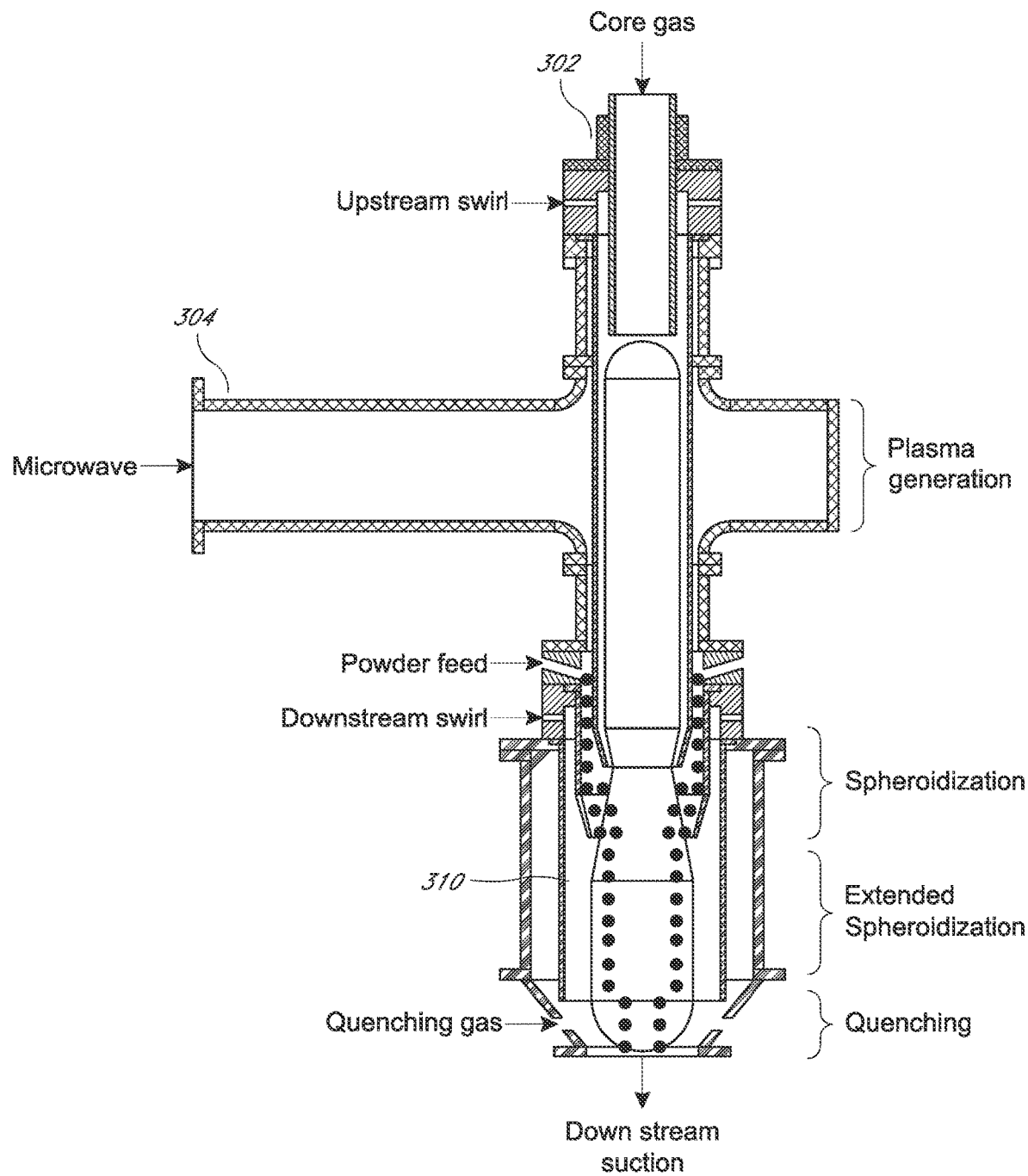

FIGS. 3A-B illustrates an exemplary microwave plasma torch that includes a side feeding hopper rather than the top feeding hopper shown in the embodiment of FIG. 2, thus allowing for downstream feeding. Thus, in this implementation the feedstock is injected after the microwave plasma torch applicator for processing in the "plume" or "exhaust" of the microwave plasma torch. Thus, the plasma of the microwave plasma torch is engaged at the exit end of the plasma torch to allow downstream feeding of the feedstock, as opposed to the top-feeding (or upstream feeding) discussed with respect to FIG. 2. This downstream feeding can advantageously extend the lifetime of the torch as the hot zone is preserved indefinitely from any material deposits on the walls of the hot zone liner. Furthermore, it allows engaging the plasma plume downstream at temperature suitable for optimal melting of powders through precise targeting of temperature level and residence time. For example, there is the ability to dial the length of the plume using microwave powder, gas flows, and pressure in the quenching vessel that contains the plasma plume.

Generally, the downstream spheroidization method can utilize two main hardware configurations to establish a stable plasma plume which are: annular torch, such as described in U.S. Pat. Pub. No. 2018/0297122, or swirl torches described in U.S. Pat. No. 8,748,785 B2 and U.S. Pat. No. 9,932,673 B2. Both FIG. 3A and FIG. 3B show embodiments of a method that can be implemented with either an annular torch or a swirl torch. A feed system close-coupled with the plasma plume at the exit of the plasma torch is used to feed powder axisymmetrically to preserve process homogeneity. Other feeding configurations may include one or several individual feeding nozzles surrounding the plasma plume. The feedstock powder can enter the plasma from any direction and can be fed in 360° around the plasma. The feedstock powder can enter the plasma at a specific position along the length of the plasma plume where a specific temperature has been measured and a residence time estimated for sufficient melting of the particles. The melted particles exit the plasma into a sealed chamber where they are quenched then collected.

The feed materials 314 can be introduced into a microwave plasma torch 302. A hopper 306 can be used to store the feed material 314 before feeding the feed material 314 into the microwave plasma torch 302, plume, or exhaust. The feed material 314 can be injected at any angle to the longitudinal direction of the plasma torch 302. 5, 10, 15, 20, 25, 30, 35, 40, 45, 50, or 55 degrees. In some embodiments, the feedstock can be injected an angle of greater than 5, 10, 15, 20, 25, 30, 35, 40, 45, 50, or 55 degrees. In some embodiments, the feedstock can be injected an angle of less than 5, 10, 15, 20, 25, 30, 35, 40, 45, 50, or 55 degrees. In alternative embodiments, the feedstock can be injected along the longitudinal axis of the plasma torch. The microwave radiation can be brought into the plasma torch through a waveguide 304. The feed material 314 is fed into a plasma chamber 310 and is placed into contact with the plasma generated by the plasma torch 302. When in contact with the plasma, plasma plume, or plasma exhaust, the feed material melts. While still in the plasma chamber 310, the feed material 314 cools and solidifies before being collected into a container 312. Alternatively, the feed material 314 can exit the plasma chamber 310 while still in a melted phase and cool and solidify outside the plasma chamber. In some embodiments, a quenching chamber may be used, which may or may not use positive pressure. While described separately from FIG. 2, the embodiments of FIGS. 3A-B are understood to use similar features and conditions to the embodiment of FIG. 2.

In some embodiments, implementation of the downstream injection method may use a downstream swirl, extended spheroidization, or quenching. A downstream swirl refers to an additional swirl component that can be introduced downstream from the plasma torch to keep the powder from the walls of the tube. An extended spheroidization refers to an extended plasma chamber to give the powder longer residence time. In some implementations, it may not use a downstream swirl, extended spheroidization, or quenching. In some embodiments, it may use one of a downstream swirl, extended spheroidization, or quenching. In some embodiments, it may use two of a downstream swirl, extended spheroidization, or quenching.

Injection of powder from below may results in the reduction or elimination of plasma-tube coating in the microwave region. When the coating becomes too substantial, the microwave energy is shielded from entering the plasma hot zone and the plasma coupling is reduced. At times, the plasma may even extinguish and become unstable. Decrease of plasma intensity means decreases in spheroidization level of the powder. Thus, by feeding feedstock below the microwave region and engaging the plasma plume at the exit of the plasma torch, coating in this region is eliminated and the microwave powder to plasma coupling remains constant through the process allowing adequate spheroidization.

Thus, advantageously the downstream approach may allow for the method to run for long durations as the coating issue is reduced. Further, the downstream approach allows for the ability to inject more powder as there is no need to minimize coating.

From the foregoing description, it will be appreciated that inventive processing methods for converting unique feedstocks to spheroidized powder are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A method for producing a spheroidized powder from a feed material comprising Tungsten (W), the method comprising:
   introducing a W powder feed material into a microwave plasma torch via a powder feeder downstream of an applicator of the microwave plasma torch; and
   melting and spheroidizing the feed material within a plasma generated by the microwave plasma torch to form spheroidized powder,
   wherein the spheroidized powder has a minimum particle size of 20 microns and a maximum particle size of 63 microns, with a D10 of at least 20 microns and a D90 of at most 55 microns.

2. The method of claim 1, wherein the introducing the feed material into the microwave plasma torch comprises introducing the powder feed material into an exhaust of the microwave plasma torch or into a plume of the microwave plasma torch.

3. The method of claim 1, wherein the spheroidized powder has a median sphericity of at least 0.75.

4. The method of claim 1, wherein the spheroidized powder has a median sphericity of at least 0.91.

5. The method of claim 1, wherein the spheroidized powder has a median sphericity of at least 0.99.

6. The method of claim 1, wherein the spheroidized powder comprises W or W alloy powder.

7. The method of claim 1, wherein the spheroidized powder comprises W powder having over 90.9% W by weight.

8. The method of claim 1, wherein the spheroidized powder comprises W powder having over 99.9% W by weight.

9. The method of claim 1, wherein the spheroidized powder comprises W alloy powder having over 90.9% W by weight.

10. The method of claim 1, further comprising sieving the powder feed material before introducing the powder feed material into the microwave plasma torch.

11. The method of claim 1, wherein the powder feed material comprises angular powder, an irregular powder, or a sponge powder.

12. The method of claim 1, further comprising cleaning the powder feed material with water, surfactant, detergent, or solvent prior to introducing the powder feed material into the microwave plasma torch.

13. The method of claim 1, further comprising deoxidizing the powder feed material prior to introducing the powder feed material into the microwave plasma torch.

* * * * *